US012596726B2

(12) United States Patent (10) Patent No.: US 12,596,726 B2

Haji Soleimani (45) Date of Patent: Apr. 7, 2026

(54) METHOD AND SYSTEM FOR EFFICIENT SEGMENTATION FOR FORECASTING

(71) Applicant: Kinaxis Inc., Ottawa (CA)

(72) Inventor: Behrouz Haji Soleimani, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/899,441

(22) Filed: Sep. 27, 2024

(65) Prior Publication Data

US 2025/0110971 A1 Apr. 3, 2025

Related U.S. Application Data

(60) Provisional application No. 63/660,803, filed on Jun. 17, 2024, provisional application No. 63/659,392, filed on Jun. 13, 2024, provisional application No. 63/658,522, filed on Jun. 11, 2024, provisional application No. 63/631,783, filed on Apr. 9, 2024, provisional application No. 63/586,690, filed on Sep. 29, 2023.

(51) Int. Cl.
*G06F 7/00* (2006.01)
*G06F 16/28* (2019.01)

(52) U.S. Cl.
CPC .................................. *G06F 16/285* (2019.01)

(58) Field of Classification Search
CPC ...................................................... G06F 16/285
USPC .................................................. 707/600–899
See application file for complete search history.

(56) References Cited

U.S. PATENT DOCUMENTS

| | | | |
|---|---|---|---|
| 6,055,539 A | 4/2000 | Singh et al. | |
| 7,428,526 B2 | 9/2008 | Miller et al. | |
| 7,783,648 B2 | 8/2010 | Bateni et al. | |
| 2013/0197975 A1 | 8/2013 | Miller et al. | |
| 2017/0169447 A1 | 6/2017 | Hajian | |
| 2021/0208987 A1* | 7/2021 | Hao | ...................... G06F 3/0647 |

* cited by examiner

*Primary Examiner* — Isaac M Woo

(74) *Attorney, Agent, or Firm* — Ruggiero McAllister & McMahon LLC

(57) ABSTRACT

Systems and methods for partitioning forecast items into segments, or groups, based on an attribute. Once partitioned, segments are aggregated based on a predetermined memory size limit using an aggregation method. Aggregation methods include methods for providing segments that have a similar number of records. Segmentation is further enhanced by including variance reduction gain as a metric for selecting the order of attributes.

15 Claims, 21 Drawing Sheets

200

| Product Category | Distribution Center | Segment ID |
|---|---|---|
| Category 1 | DC 1 | 1 |
| Category 1 | DC 2 | 2 |
| Category 2 | DC 1 | 3 |
| Category 2 | DC 2 | 4 |
| Category 3 | DC 1 | 5 |
| Category 3 | DC 2 | 6 |
| Category 4 | DC 1 | 7 |
| Category 4 | DC 2 | 8 |

300

| Product Category | Distribution Center | Number of Rows | Segment ID |
|---|---|---|---|
| Category 1 | DC 1 | 4,000,000 | 1 |
| Category 1 | DC 2 | 3,000,000 | 2 |
| Category 2 | DC 1 | 1,000,000 | 3 |
| Category 2 | DC 2 | 750,000 | 4 |
| Category 3 | DC 1 | 500,000 | 5 |
| Category 3 | DC 2 | 375,000 | 6 |
| Category 4 | DC 1 | 400,000 | 7 |
| Category 4 | DC 2 | 300,000 | 8 |

Entropy based aggregation

1400

| | Metric | Segmentation | Feature Generation | Training | Inference | Total |
|---|---|---|---|---|---|---|
| Native Segmentation (with fan-out) | Resource | - | 20 x D64 | 35 x D64 | 30 x D64 | |
| | Time | - | 11h20m | 58h25m | 60h | ~131h |
| | Artifact size | - | 328 GB | 6.2 TB | 186 GB | 6.8 TB |
| | CPU Hours | - | 14,506 | 133,093 | 115,200 | 262,799 |
| | | | | | | |
| Smart Segmentation (with fan-out) | Resource | 2 x D64 | 20 x D64 | 30 x D64 | 30 x D64 | |
| | Time | 2h | 4h11m | 9h26m | 1h10m | ~16h |
| | Artifact size | 65 MB | 197 GB | 42 GB | 122 GB | 361 GB |
| | CPU Hours | 256 | 5,354 | 18,112 | 2,240 | 25,962 |
| | | | | | | |
| | Speedup | - | 2.71x | 7.34x | 51.42x | 10.12x |
| | Storage reduction | - | 1.96x (49.2%) | 148x (99.3%) | 1.52x (34.4%) | 18.9x (94.7%) |

1500

1502

1504

1506

METHOD AND SYSTEM FOR EFFICIENT SEGMENTATION FOR FORECASTING

The present application claims priority to: U.S. Provisional Patent Application No. 63/586,690, filed Sep. 29, 2023; U.S. Provisional Patent Application No. 63/631,783, filed Apr. 9, 2024; U.S. Provisional Patent Application No. 63/658,522, filed Jun. 11, 2024; U.S. Provisional Patent Application No. 63/659,392, filed Jun. 13, 2024; and U.S. Provisional Patent Application No. 63/660,803, filed Jun. 17, 2024; the entirety of all of which are hereby incorporated by reference.

BACKGROUND

Sales forecasting and demand forecasting is a complicated task as there are many factors that can affect the demand, such as seasonality, holidays, local events, promotions, marketing, advertising, pricing, competitor offerings and pricing, product reviews, economic factors, weather, etc. The sales of each item at each location is a time-series from an introduction date of the item to a current date. Machine Learning algorithms can be used for time-series forecasting and to predict sales.

In addition, demand forecasting is often conducted for customers in different industries, such as manufacturing, high-tech, automotive, aerospace, life sciences, etc. Therefore, a demand forecasting solution should be universally applicable to all industries and to meet the needs and requirements of different customers. These industries also have vastly different scale requirements in terms of number of time-series that are to be forecasted. For instance, a manufacturing company may have few manufacturing site/plants, hundreds of products, and tens or hundreds of customers. Manufacturers usually prefer to predict the total demand of each item per site per customer. This results in hundreds of thousands of time-series to be forecasted (also called "forecast items"). On the other hand, a medium size retailer has around 20,000 items and 500 locations which results in 10,000,000 time-series to be forecasted (forecast of each item at each location). A large retailer, on the other hand, usually has around 60,000 items and 2,000 locations resulting in 120,000,000 time-series to be forecasted. Quick Service Restaurants (QSR) also have large number of item-locations to forecast. Fast food chains have fewer items (~1,000) but more locations (~15,000) which results in the same scale requirements as mid-size retailer.

Traditional time-series forecasting methods, including statistical forecasting methods, predict each time-series separately. For instance, one has to train millions of forecasting models in order to predict for millions of time-series. This can be very slow, while also requiring a lot of overhead in terms of parallelization, I/O operations, and the like.

However, it is possible to use Machine Learning algorithms that are trained on a collection of time-series (rather than individual time-series). Training models on a group of forecast items has a few benefits, with respect to performance/efficiency and accuracy. In terms of performance and efficiency, it is more efficient to train thousands of models instead of millions of models, from compute and storage cost to I/O and network usage. In terms of accuracy of predictions, a machine learning model can learn from multiple time-series and generalize across the group.

A group of forecast items that are trained together, can be defined as a "segment". One machine learning model can be trained per segment. Furthermore, "segmentation" is defined as the partitioning of all forecast items into groups/segments. For instance, if there are 20,000,000 forecast items, these may be partitioned into 20,000 segments, where each segment contains on average 1,000 forecast items. In this case, 20,000 Machine Learning models are trained in order to forecast for all 20,000,000 time-series.

From an operational point of view and runtime/cost optimization, it is beneficial if all segments have the same number of records so that they take roughly the same amount of time for processing and model training. This results in the least amount of overhead and the best parallelization potential.

Most solutions use a predefined set of keys or attributes to be used as segmentation keys. And these keys can be used to partition the data into groups. Typically, product attributes (e.g. business unit, product category, etc.) or location attributes (e.g. distribution center, state, region, etc.) are good candidates to be used as segmentation keys. This form of grouping is very intuitive and makes a lot of sense from the business point of view and also from a user perspective.

However, there are issues with this approach. If only one attribute is used for segmentation (for example, distribution center location), there can be roughly 1-2 orders of magnitude difference in the size for all the resulting segments, due to the natural asymmetry in the data distribution of only one attribute. While further segmentation, according to further attributes, results in a decrease in the size variation of segments, it can often result in a roughly $10^5$-fold increase in the number of segments that are used for training, resulting in a $10^5$-fold increase in the number of machine learning models used to train on the resulting segments. This creates a lot of overhead on reading artifacts from storage, saving output artifacts from storage, and also parallelization inefficiencies because the job sizes can be very different.

There is thus a need for a segmentation technique that generates a minimum number of segments of roughly the same size.

BRIEF SUMMARY

Disclosed herein are systems and methods for partitioning forecast items into segments, or groups, based on one or more attributes, which are roughly the same size. This improves the parallelization potential as all jobs require roughly the same amount of time. These systems and methods also generate fewer segments in total, which means fewer models to train, fewer artifacts to save and load, fewer network calls and data transfer, and faster runtime overall.

Disclosed herein are systems and methods that take a list of business-driven segmentation keys, or attributes, as input, in addition to a memory limit that can be configured, then partitions the data into segments of roughly equal size that can be used for training machine learning models.

Disclosed herein are systems and methods that first partition data into segments according to an attribute. Once partitioned, segments are then aggregated based on a predetermined memory size limit using an aggregation method. Aggregation methods include methods for providing segments that have a similar number of records. Having similar-sized segments can increase feature generation, training and inference speed and reduce memory needed for feature generation, training and inference. The combination of segmentation and aggregation (that results in a final set of segments for machine learning training) is hereinto referred as "efficient segmentation".

Efficient segmentation increases speed by ~10× speedup on an end-to-end forecasting run. It improved on aspects of ML pipelines from CPU utilization, memory utilization, storage reduction, reducing network calls, reducing IO operations, and so forth. Efficient segmentation results in fewer segments, which means: saving fewer artifacts across all modules, loading fewer artifact across all modules, fewer network calls and IO operations, larger segments across all modules and fewer machine learning models to train. It also results in larger segments which in turn results in better compression of parquet files and less storage across all modules—resulting in a higher training efficiency. Moreover, fewer models to train results in significantly less storage for training output. Efficient segmentation results in equal size segments which means optimal parallelization and no compute bottleneck across all modules and easier infrastructure configuration, node pool and environment setup. Additionally, configurable and equal segment size results in more robustness including fewer Out-Of-Memory (OOM) errors and more manageable resources, fewer network and IO exceptions (which occurs because of too many calls).

In addition, disclosed herein is an automated way of selecting the best attributes for partitioning and the order in which the attributes should be used, according to certain objectives. This results in a partitioning that is both efficient and accurate, which is hereinto referred as "enhanced efficient segmentation". That is, the machine learning models that are trained on these partitions are more accurate than other partitioning.

Segments generated by either efficient segmentation, or enhanced efficient segmentation are used to train machine learning models. These machine learning models can be linear regression, decision trees, support vector machines (SVM), neural networks, and gradient boosting methods.

In one aspect, a computing apparatus is provided, that includes a processor. The computing apparatus also includes a memory storing instructions that, when executed by the processor, configure the apparatus to segment a root node that includes a dataset, into a plurality of segments according to a first attribute, the root node exceeding a memory threshold. The computing apparatus also includes a memory storing instructions that, when executed by the processor, configure the apparatus to aggregate two or more of the segments into one or more aggregated segments, the one or more aggregated segments each having a memory size equal to or below the memory threshold. The computing apparatus also includes a memory storing instructions that, when executed by the processor, configure the apparatus to recursively segment, according to successive attributes, any segment that exceeds the memory threshold; and aggregate two or more segments into aggregated segments that are less than or equal to the memory threshold, until no further segmentation or aggregation can be performed.

In the computing apparatus, aggregating may be based on memory usage and resource utilization; aggregating may be further based on a best-fit algorithm or an entropy-based algorithm. In the computing apparatus, aggregating may be based on grouping segments with similar features. Other technical features may be readily apparent to one skilled in the art from the following figures, descriptions, and claims.

In one aspect, a non-transitory computer-readable storage medium, the computer-readable storage medium including instructions that when executed by a computer, cause the computer to: segment a root node that includes a dataset, into a plurality of segments according to a first attribute, the root node exceeding a memory threshold; aggregate two or more of the segments into one or more aggregated segments, the one or more aggregated segments each having a memory size equal to or below the memory threshold; recursively:

segment, according to successive attributes, any segment that exceed the memory threshold; and aggregate two or more segments into aggregated segments that are less than or equal to the memory threshold, until no further segmentation or aggregation can be performed.

In the computer-readable storage medium, aggregating may be based on memory usage and resource utilization; aggregating may be further based on a best-fit algorithm or an entropy-based algorithm. In the computer-readable storage medium, aggregating may be based on grouping segments with similar features. Other technical features may be readily apparent to one skilled in the art from the following figures, descriptions, and claims.

In one aspect, a computer-implemented method for segmenting a dataset into a plurality of segments, the dataset grouped according to a plurality of attributes, is provided. The method includes segmenting a root node that includes the dataset, into a plurality of segments according to a first attribute, the root node exceeding a memory threshold. The computer-implemented method also includes aggregating two or more of the segments into one or more aggregated segments, the one or more aggregated segments each having a memory size equal to or below the memory threshold. The computer-implemented method also includes recursively segmenting, according to successive attributes, any segment that exceed the memory threshold; and aggregating two or more segments into aggregated segments that are less than or equal to the memory threshold, until no further segmentation or aggregation can be performed.

The computer-implemented method may also include where aggregating is based on memory usage and resource utilization; aggregating may be further based on a best-fit algorithm or an entropy-based algorithm. The computer-implemented method may also include where aggregating is based on grouping segments with similar features. Other technical features may be readily apparent to one skilled in the art from the following figures, descriptions, and claims.

In one aspect, a computing apparatus is provided, that includes a processor. The computing apparatus also includes a memory storing instructions that, when executed by the processor, configure the apparatus to a) for each attribute, segment a parent node containing a dataset into a respective set of a plurality of child nodes based on an attribute, each of the plurality of child nodes having a memory size, b) select the set of the plurality of child nodes that has a maximum variance reduction gain from a parent level to a child level containing the set of plurality of child nodes, c) determine a maximum size of each of the plurality of child nodes, d) where the maximum size exceeds a memory threshold, further segment the selected set of the plurality of nodes according to each remaining attribute until the maximum size of a child node is less than the memory threshold, and e) obtain a sequential list of attributes for use in efficient segmentation.

In one aspect, a non-transitory computer-readable storage medium is provided, the computer-readable storage medium including instructions that when executed by a computer, cause the computer to a) for each attribute, segment a parent node containing a dataset into a respective set of a plurality of child nodes based on an attribute, each of the plurality of child nodes having a memory size, b) select the set of the plurality of child nodes that has a maximum variance reduction gain from a parent level to a child level containing the set of plurality of child nodes, c) determine a maximum size of each of the plurality of child nodes, d) where the maximum size exceeds a memory threshold, further segment the selected set of the plurality of nodes according to each remaining attribute until the remaining attribute until the maximum size of a child node is less than the memory threshold, and e) obtain a sequential list of attributes for use in efficient segmentation.

In one aspect, a computer-implemented method for segmenting a dataset into a plurality of segments, the dataset grouped according to a plurality of attributes is provided. The method includes a) for each attribute, segmenting a parent node containing the dataset into a respective set of a plurality of child nodes based on the attribute, each of the plurality of child nodes having a memory size, b) selecting the set of the plurality of child nodes that has a maximum variance reduction gain from a parent level to a child level containing the set of plurality of child nodes, c) determining a maximum size of each of the plurality of child nodes, d) where the maximum size exceeds a memory threshold, further segmenting the selected set of the plurality of nodes according to each remaining attribute until the maximum size of a child node is less than the memory threshold, and e) obtaining a sequential list of attributes for use in efficient segmentation.

The details of one or more embodiments of the subject matter of this specification are set forth in the accompanying drawings and the description below. Other features, aspects, and advantages of the subject matter may become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
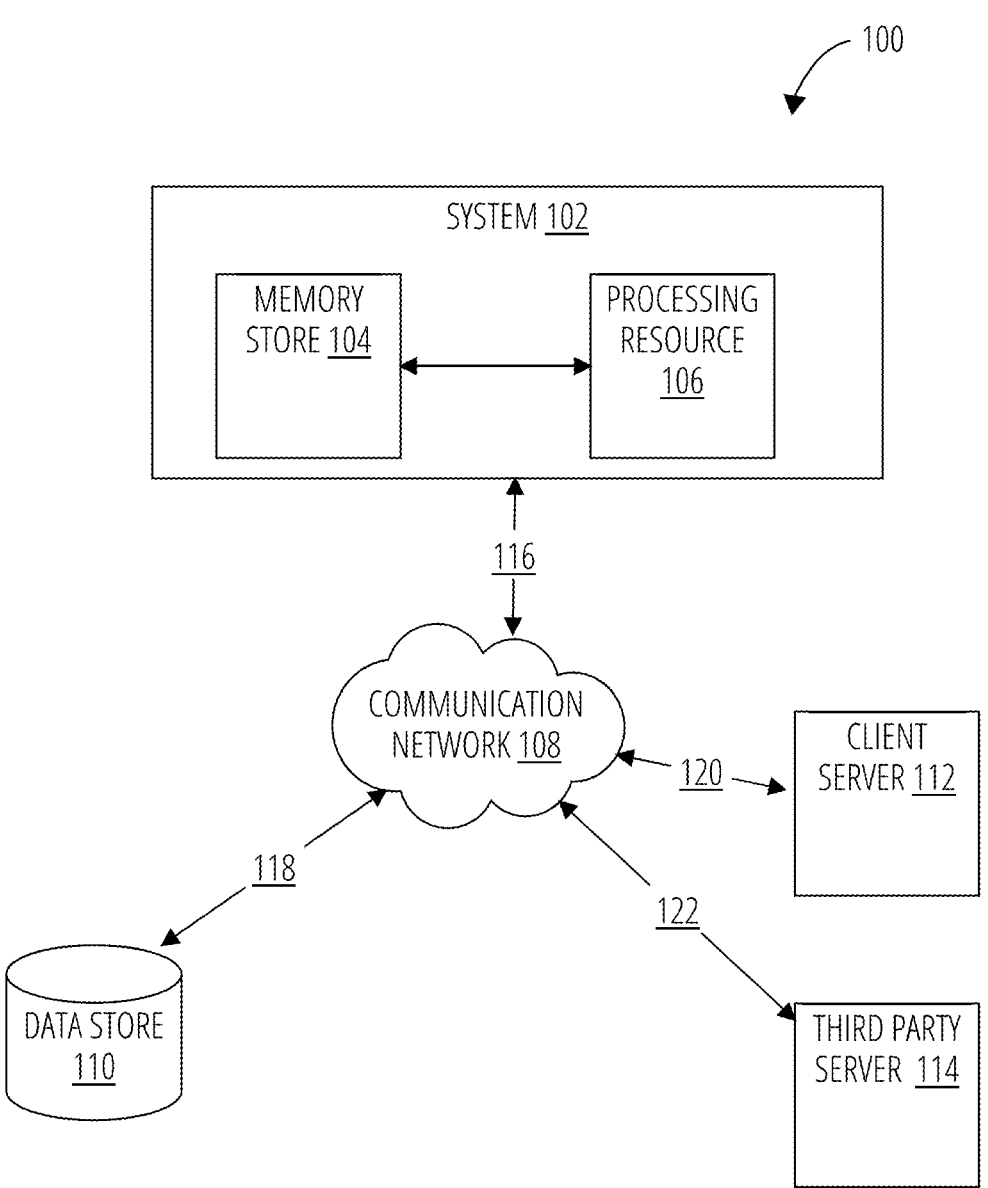
FIG. 1 illustrates an exemplary environment with which some embodiments may operate.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification may be labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor(s) of a general purpose computer(s), special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a standalone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, efficient phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification may be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

FIG. 1 illustrates an exemplary environment with which some embodiments may operate.

FIG. 1 shows System 102 in an exemplary Environment 100 with which some embodiments may operate. System 102 includes a Memory Store 104 and a Processing Resource 106. Processing Resource 106 may include one or more processors and/or controllers, which may take the form of a general or a special purpose processor(s) or controller(s). In exemplary implementations, Processing Resource 106 may be, or include, microprocessors, microcontrollers, application specific integrated circuits, digital signal processors, and/or other data processing devices. Processing Resource 106 may be a single device or distributed over a network.

Memory Store 104 may be or include one or more non-transitory computer-readable storage media, such as optical, magnetic, organic, or flash memory, among other data storage devices and may take any form of computer readable storage media. Remote Data store 110 may be a single device or may be distributed over a network.

Processing Resource 106 and Memory Store 104 may be communicatively coupled by a system communication bus, a wired network, a wireless network, or other connection mechanism and arranged to carry out various operations described herein. Optionally, two or more of these components may be integrated together in whole or in part.

System 102 is communicatively coupled to a communication Network 108 as shown by arrow 116. Communication Network 108 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication Network 108 may operate according to one or more communication protocols, such as, General Packet Radio Service (GPRS), Universal Mobile Telecommunications Service (UMTS), Global System for Mobile (GSM), Enhanced Data Rates for GSM Evolution (EDGE), Long Term Evolution (LTE), CDMA (Code-division Multiple Access) (CDMA), WCDMA (Wide Code-division Multiple Access), (High Speed Packet Access (HSPA), Evolved HSPA (HSPA+), Low-power WAN (LPWAN), Wi-Fi, Bluetooth, Ethernet, Hypertext Transfer Protocol Secure (HTTP/S), Transmission Control Protocol/Internet Protocol (TCP/IP), and Constrained Application Protocol/Datagram Transport Layer Security (CoAP/DTLS), or other suitable protocol. Communication Network 108 may take other forms as well.

Also shown in FIG. 1 is a remote Data store 110, remote Client server 112 and remote third Party server 114, each communicatively coupled to communication Network 108, as shown by arrows 118, 120 and 122, respectively. For example, System 102 can communicate with Data store 110, Client server 112 and third Party server 114, via communication Network 108. Furthermore, Data store 110 can communicate with Client server 112 and third Party server 114, via communication Network 108.

Machine Learning algorithms may be trained on a collection of time-series instead of on individual time-series. A specific and non-limiting example of time-series data includes historical client data, including point-of-sales data that provides information on the amount of product sold on a particular day at a particular location; and inventory of a particular product at a particular location. Training models on a group of forecast items can provide benefits in terms of performance and efficiency. For instance, it is more efficient to train thousands of models instead of millions of models, from compute and storage cost to I/O and network usage. Training models on a group of forecast items can also improve accuracy of predictions. For instance, the model can learn from multiple time-series and generalize across the group. There are potentially common patterns across a group of forecast items. For instance, if a model is trained on all ice-cream products from a retailer (different flavours and sizes), then all of the ice-cream products have similar seasonality (higher sales in summer and lower sales in winter). In another instance, a specific type of promotion may have a similar effect on the sales of a group of items. In yet another instance, locations in the same region can have similar sales patterns. In these examples the model can learn patterns across many forecast items that have better generalization capability, resulting in better prediction of future sales.

Training models on a group of forecast items also enables consideration of cross-product interactions. For instance, if a specific toothpaste is promoted, it will affect the sales of other products in the same category. In another instance, introduction of a new item can affect the sales of other items in the same category, such as, a new type of beef sandwich may impact the sales of existing beef sandwiches.

As discussed above, it is beneficial for all segments to have roughly the same number of records such that it takes a similar amount of time for processing and model training. Using similar-sized segments minimizes the amount of overhead and increase parallelization potential. In a present example, 20,000 segments of approximately the same size can be used to train 20,000 Machine Learning models. If the work of training 20,000 machine learning models is parallelized/distributed, then each job can take roughly the same amount of time. In this example, the longest job and shortest job take roughly the same amount of time and there is no bottleneck caused by a longer running job. Furthermore, the memory requirement of those jobs may also be similar as these jobs will be loading roughly the same amount of data in memory. Therefore, those jobs can all be run on physical/virtual nodes with similar specifications. Doing so simplifies operations, management of the jobs and costs. Otherwise, a large node that fits the largest job is specified, and the same specification is then used for all segments, which results in a waste of resources for smaller jobs. Alternatively, the memory requirements for each segment can be determined dynamically, allocating a proper node size for each, which is quite complex to engineer and operate.

Figures 2, 3:
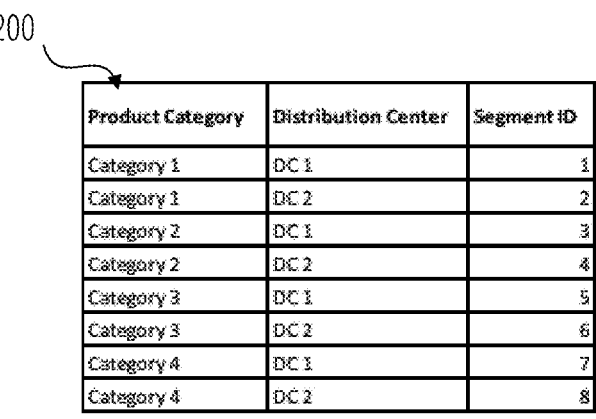
FIG. 2 illustrates exemplary segments partitioned on product category and distribution centre.
FIG. 3 illustrates exemplary segments partitioned on product category and distribution centre having a few extra large segments and many small segments.

FIG. 2 illustrates exemplary segments partitioned, or grouped, according to product category and distribution centre. According to an embodiment, a predefined set of keys or attributes can be used as segmentation keys. These segmentation keys can be used to partition the data into groups. Typically, product attributes (e.g. business unit, product category, etc.) or location attributes (e.g. distribution center, state, region, etc.) may be good candidates to be used as segmentation keys. For instance, product category and distribution center can be defined as segmentation keys. In this case, each combination of product category and distribution centre can be designated as a separate segment.

For instance, segmenting by product category results in having a separate machine learning model for each category. If the forecasts for one category are inaccurate, only the corresponding machine learning model needs to be adjusted or tuned.

This type of segmentation can also be used in partitioning Parquet files at storage level. The Parquet format allows a user to partition on some attributes; it can also physically split and partition files into subfolders with smaller parquet files holding specific subsets of data.

Although this type of partitioning/segmentation is very intuitive and easy to use, the biggest drawback is that no matter which attributes are chosen for segmentation, the result always includes very few extra large segments and many tiny segments. For example, some categories or brands have more items, some states have more locations, some distribution centers serve more stores, and so on. For any manufacturer, retailer, or any industry in general, usually 20% of the products represent 80% of the business. An example of this situation is illustrated in FIG. 3, in which segments are grouped according to product category and distribution centre, resulting in a few extra large segments and many small segments.

Figure 4:
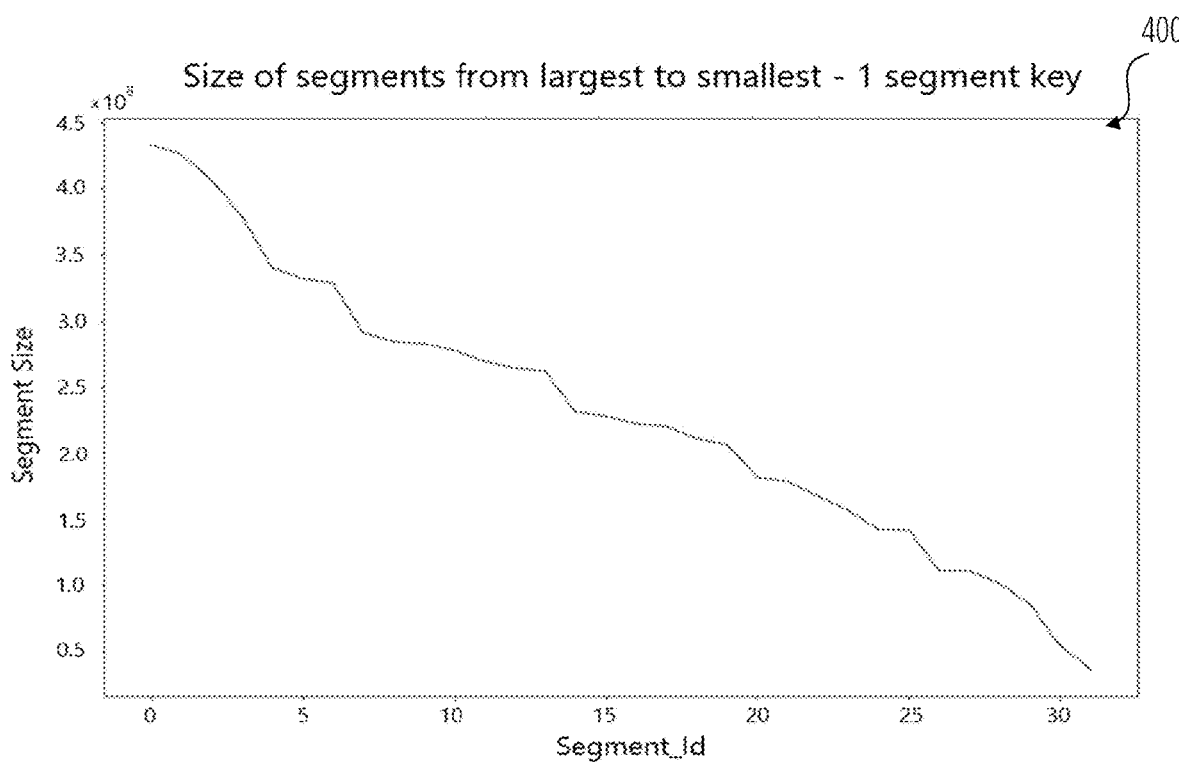
FIG. 4 illustrates an exemplary chart of segment size versus segment ID using one segmentation key.

FIG. 4 illustrates an exemplary chart of segment size versus segment ID using one segmentation key. FIG. 4 illustrates an exemplary chart 400 of segment size vs segment ID, using one segmentation key, such as distribution centre. Chart 400 shows the difference in size of segments for all the distribution centers ranging from 48,000,000 to 440,000,000 rows which is roughly one order of magnitude difference.

440,000,000 rows are generally too big to fit in memory, due to the many features that are extracted from the data, and that must also be saved in memory with the segment data. As such, it is difficult to train a machine learning model using a segment with 440,000,000 rows.

For example, an environment that uses nodes with 32 CPU cores and 128 GB of RAM, can train models on segments of up to 3M rows, including approximately about 200 features, successfully without 'out of memory' issues. As such, the segments shown in FIG. 4 would have to be split into smaller manageable size segments, using more attributes for segmentation. When using more than one attribute for segmentation, each attribute can have similar distribution as chart 400; and by creating a segment on each combination of attributes, there is a multiplicative effect, and the distribution of segment size becomes more skewed.

Figure 5:
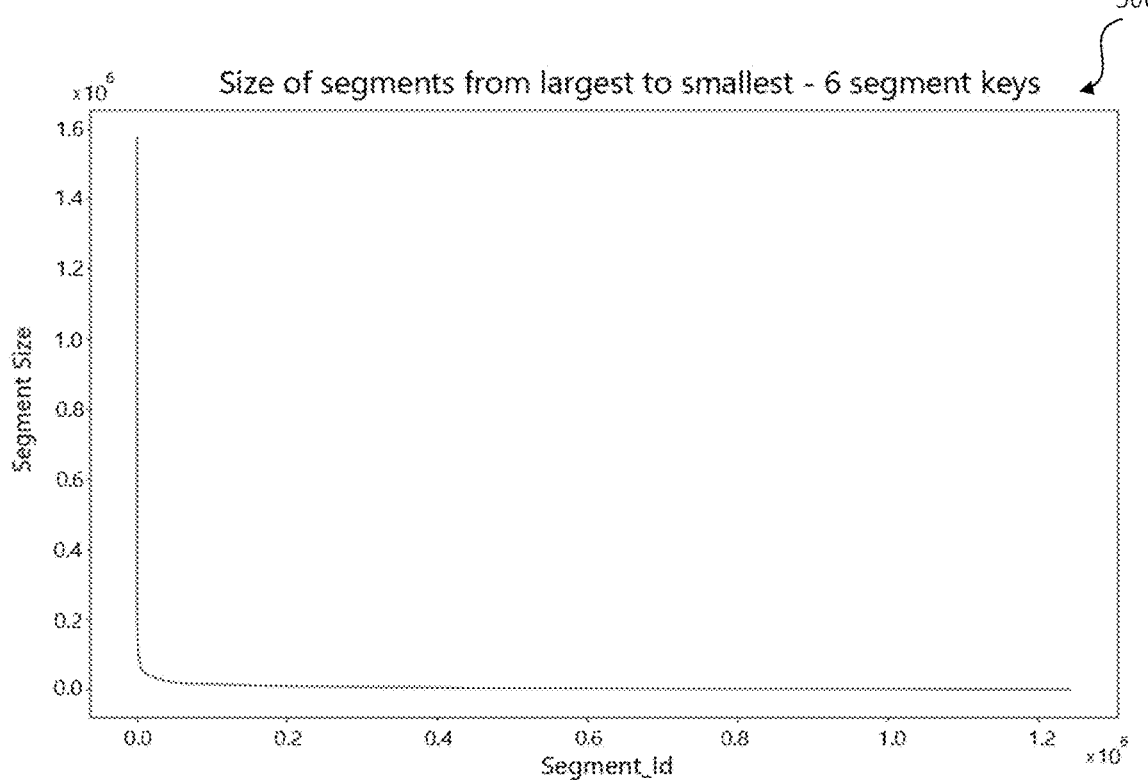
FIG. 5 illustrates an exemplary chart of segment size versus segment ID using six segmentation keys based on Naive Segmentation.

FIG. 5 illustrates an exemplary chart 500 of segment size versus segment ID using six segmentation keys. The method of segmentation used in FIG. 5 is known as Naive Segmentation. Six segmentation keys have been used in order to get below the 3,000,000 rows limit. This results in over 1,200, 000 segments. Thus 1,200,000 machine learning models (one for each segment) are to be trained. This number of machine learning models creates a lot of overhead on reading artifacts to the storage, saving output artifacts from storage, and also parallelization inefficiencies due to the differences in the job sizes (as seen in chart 500, segment sizes vary several orders of magnitude from 20 rows to 2,000,000 rows).

Systems and methods disclosed herein provide a marked improvement over Naive Segmentation. According to an embodiment, there is a method for segmenting data to form segments of roughly the same size, corresponding to a memory size limit, or threshold. Segments of roughly the same size can improve parallelization as all jobs require roughly the same amount of processing time. Also fewer segments in total are generated. In a first example, the memory limit of physical/virtual nodes is 100 GB. Provided segments can be generated in such a way that all require around 100 GB, for processing then a minimum number of segments based on these constraints will result. Having fewer segments means fewer models to train, fewer artifacts to save and load, fewer network calls and data transfer, and faster runtime overall.

The method can provide for segmenting data to form segments of roughly the same size uses segmentation keys or attributes as input, in addition to a predetermined memory limit that may be configurable by a user. The method further partitions the data into segments of roughly equal size. This method is referred hereinafter as "efficient segmentation".

Efficient segmentation is a tree-based algorithm that is built hierarchically. Efficient segmentation starts with the smallest tree (that is, one root node containing all the data), which can be incrementally split and expanded if necessary. A node may be a segment which may be split into child nodes and leaves (multiple segments based on an attribute). If a node (segment) is already small enough that fits within predetermined memory constraints, the node is not split. Post splitting of nodes (segments), the resulting child nodes (segments) are analyzed and aggregated, if possible. For example, a node represents a first attribute, and is split by a next attribute which results in 15 nodes (segments). If any of the 15 nodes can be merged into larger segments, they will be merged until no further merges can be made without violating the memory size limit. For instance, a node can be split into 15 child nodes, and can then be aggregated resulting in 6 child nodes.

Steps for efficient segmentation can include: start with a universe of everything (that is, all data in the root node); split the node if it is exceeds a pre-set memory threshold that is configurable; aggregate one or more of the resulting child nodes into one or more aggregates that are below the memory threshold; and repeat the steps of splitting and aggregation recursively for all segmentation keys until no further splitting or aggregation can be made.

Figure 6:
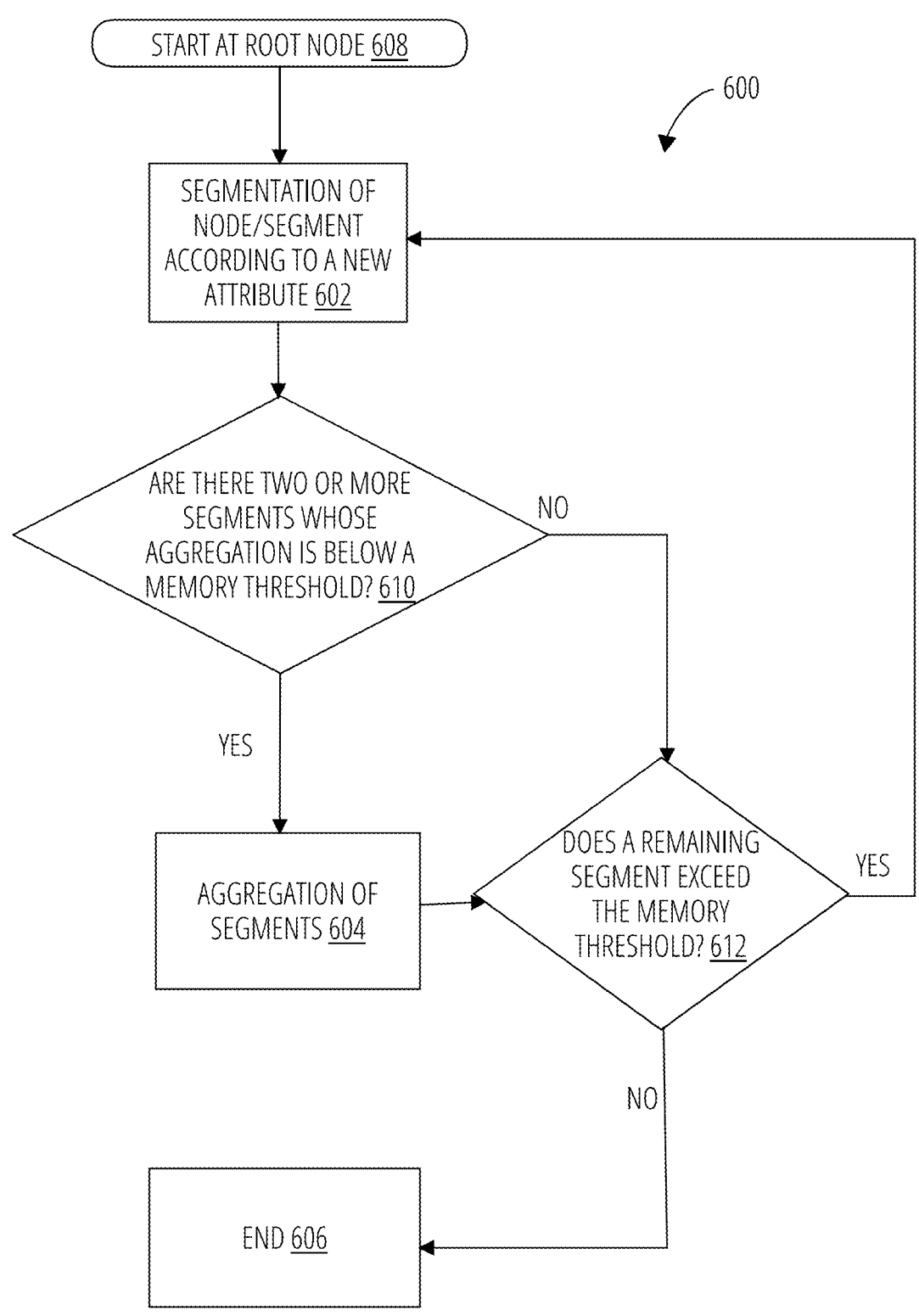
FIG. 6 illustrates a block diagram for efficient segmentation, in accordance with one embodiment.

FIG. 6 illustrates a block diagram 600 for efficient segmentation, in accordance with one embodiment. At block 608, System 102 begins at a root node, and at block 602, System 102 segments a parent node into a plurality of child nodes, or segments, based on a first attribute. Next, System 102 checks to see if there are two or more segments, whose aggregation results in an aggregated segment that is s below a pre-set memory threshold at decision block 610. If the answer is 'yes', then aggregation of segments takes place at 604. System 102 then checks to see if there are any remaining segments, obtained at block 602 which exceed the memory threshold at decision block 612. If the answer at decision block 610 is 'no', System 102 checks to see if any of the remaining segments, obtained at block 602 exceed the pre-set memory threshold at decision block 612.

If there are no remaining segments, that exceed the memory threshold ('no' at decision block 612), there is no more segmentation to take place, and the process ends at 606. On the other hand, if there are segments that exceed the memory threshold ('yes' at decision block 612), further segmentation takes place. System 102 returns to block 602, and proceeds to segment the segment according to a new attribute, and the procedure repeats, until no further segmentation can take place. An example of data processed using block diagram 600 is illustrated in FIG. 7A-FIG. 7D.

Figure 7A:
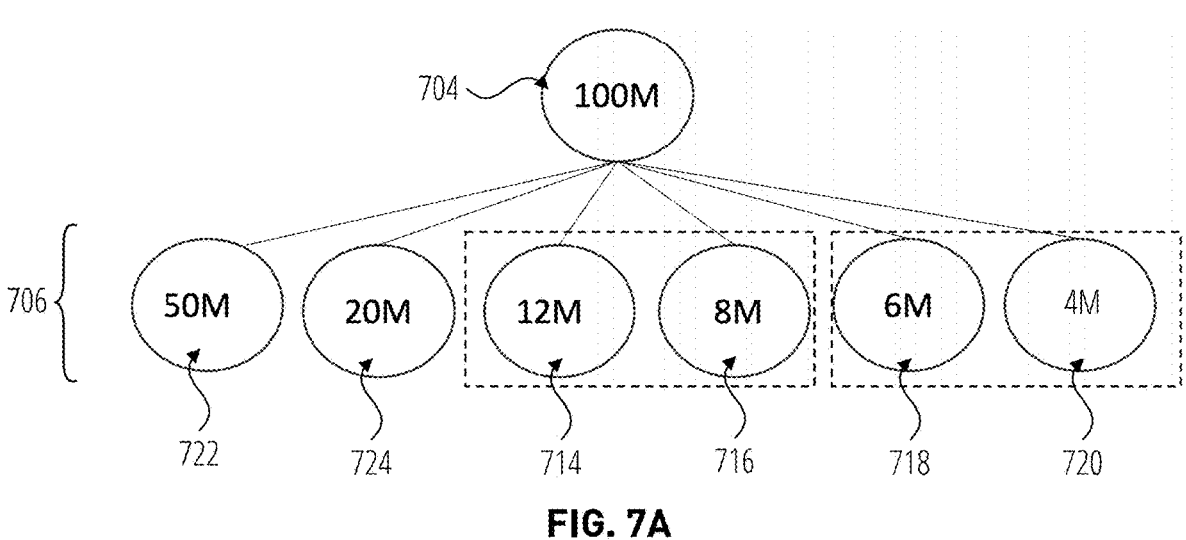
FIG. 7A illustrates segmentation of a root node partitioned into segments in accordance with an embodiment.

FIG. 7A illustrates segmentation of a root node partitioned into segments in accordance with an embodiment. With reference to FIG. 6, at block 602, System 102 segments a parent node into a plurality of child nodes based on an attribute. For example, shown in FIG. 7A is root node 704 having a memory size of 100 MB. System 102 segments root node 704 according to a first attribute, such as distribution center. Segmenting root node 704 results in producing segments 706 having memory sizes 50 MB (segment 722), 20 MB (segment 724), 12 MB (segment 714), 8 MB (segment 716), 6 MB (segment 718), and 2 MB (segment 720), as shown in FIG. 7A.

With reference to FIG. 6, System 102 then proceeds to decision block 610, to check if there are two or more segments whose aggregation is below a pre-set memory threshold. An exemplary memory threshold is 20 MB. In a first example, the total combined memory size of segment 714 and segment 716 is 20 MB which does not exceed the memory threshold, 20 MB. In a second example, the total combined memory size of segment 718 and segment 720 is 8 MB which does not exceed the memory threshold, 20 MB. As such, the answer is 'yes' at decision block 610. System 102 then proceeds to block 604, to aggregate segments, which is illustrated in FIG. 7B.

Figure 7B:
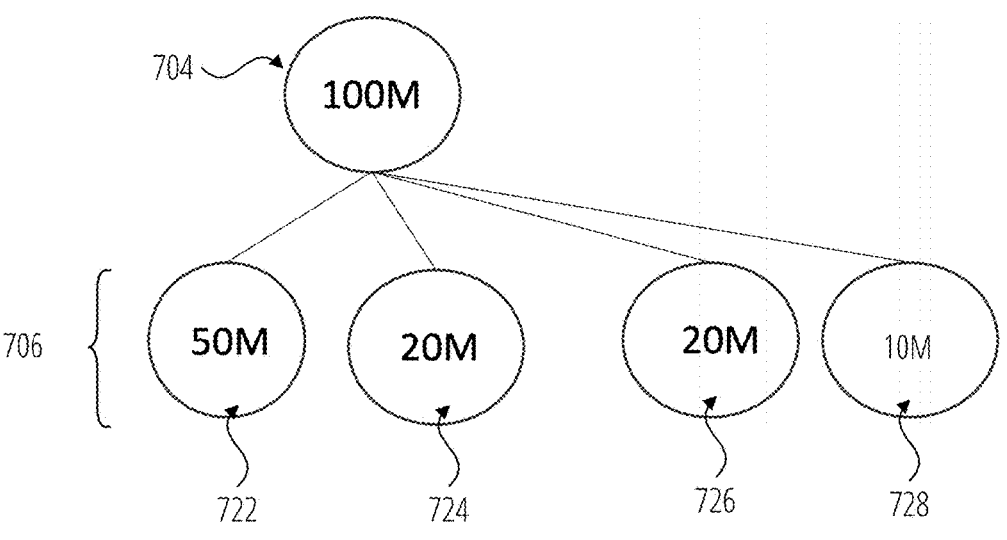
FIG. 7B illustrates aggregation of a subset of segments generated in FIG. 7A.

FIG. 7B illustrates aggregation of a subset of segments generated in FIG. 7A. In the first example, the total combined memory size of segment 714 and segment 716 is 20 MB which does not exceed the memory threshold, 20 MB. As such, segments 714 and 716 can be combined to create aggregated segment 726, as shown in FIG. 7B. Similarly, in the second example, the total combined memory size of segments 718 and 720 is 8 MB which does not exceed the memory threshold, 20 MB. As such, segments 718 and 720 can be combined to form aggregated segment 728, as shown in FIG. 7B.

With reference to FIG. 6, System 102 then proceeds to decision block 612, to check if a remaining segment exceeds the memory threshold of 20 MB. In FIG. 7B, for example, segment 722 has a memory size of 50 MB which exceeds the memory threshold, 20 MB. As such, System 102 returns to block 602. At block 602, segment 722, now a parent node, is partitioned into segments which is further illustrated in FIG. 7C.

Figure 7C:
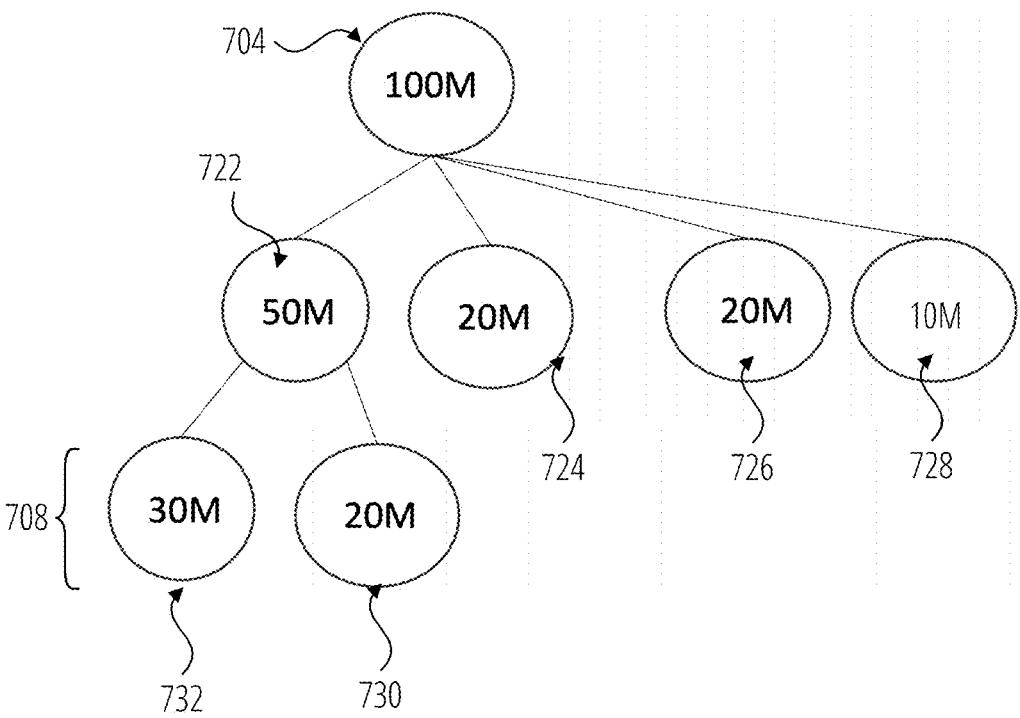
FIG. 7C illustrates segmentation of a segment generated in FIG. 7A.

FIG. 7C illustrates segmentation of a segment generated in FIG. 7A. For example, segment 722, having a memory size of 50 MB, exceeds the memory threshold of 20 MB. System 102 segments segment 722 according to a new attribute, such as, for example, city. Recall that the first segmentation of the root node was performed according to distribution center. Segment 722 is partitioned into a plurality of segments 708 in FIG. 7C. Segment 732 has a memory size of 30 MB, while segment 730 has a memory size of 20 MB, both of which do not exceed the memory threshold of 20 MB. Segment 724, aggregated segment 726, aggregated segment 728, and segment 730 do not exceed memory threshold, 20 MB. As such, these segments are not further partitioned.

System 102 proceeds to decision block 610 to check if there are two or more segments whose aggregation is below the memory threshold of 20 MB. In FIG. 7C, there is no combination of the five segment 724, aggregated segment 726, aggregated segment 728, segment 730 and segment 732, that is below the memory threshold of 20 MB.

Since the answer is 'no' at decision block 610, System 102 proceeds to decision block 612, to check if a remaining segment exceeds the memory threshold of 20 MB. In FIG. 7C, for example, segment 732 has a memory size of 30 MB which exceeds the memory threshold of 20 MB. As such, System 102 returns to block 602 to proceed with further segmentation, which is shown in FIG. 7D.

Figure 7D:
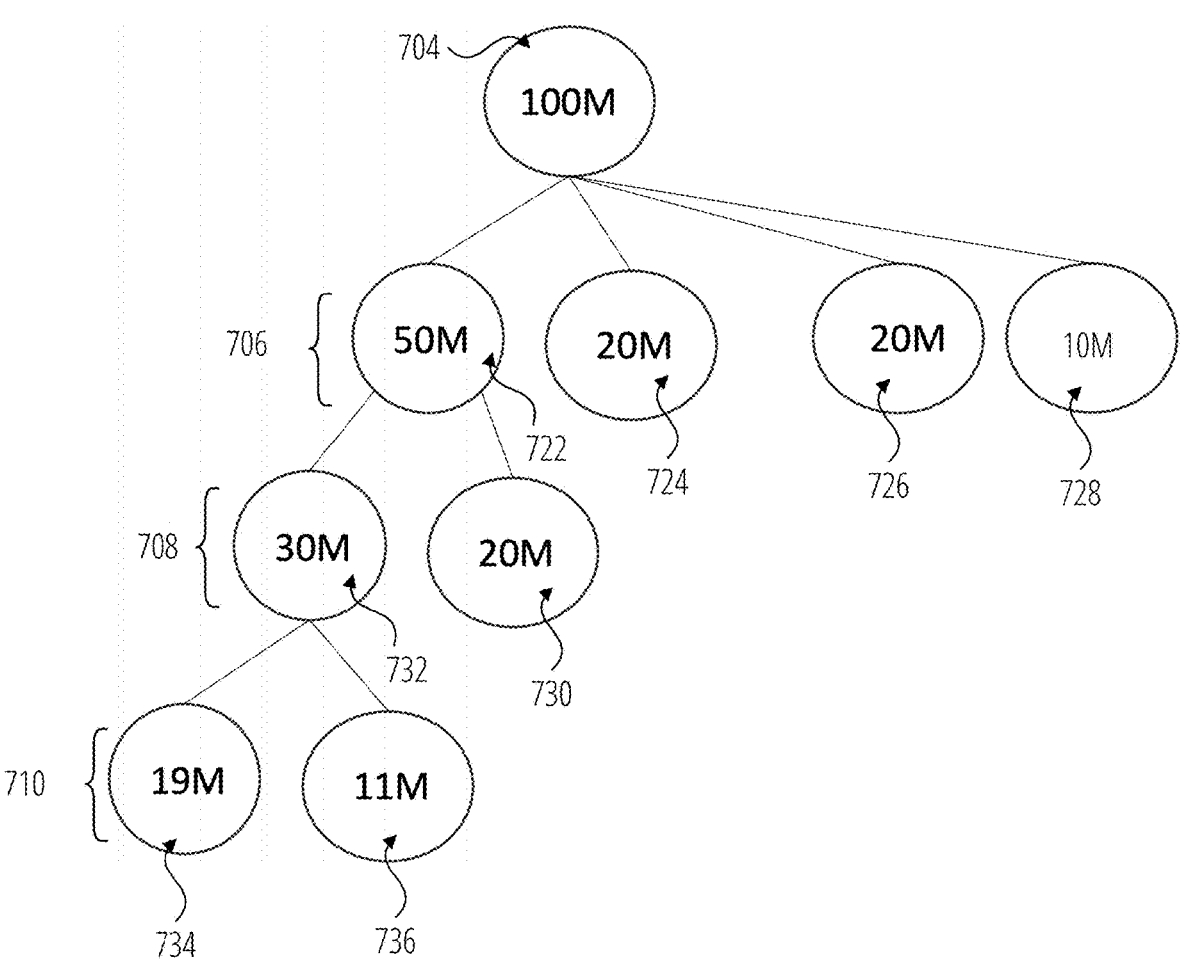
FIG. 7D illustrates segmentation of a segment generated in FIG. 7C.

FIG. 7D illustrates segmentation of a segment generated in FIG. 7C. With respect to FIG. 6, at block 602, segment 732, now a parent node, is partitioned into a plurality of segments 710 based on a new attribute. For example, System 102 segments segment 732 according to a new attribute, such as, for example, state. Recall that the first segmentation of the root node was performed according to distribution center, and the second segmentation of segment 722 was performed according to city.

Segmenting segment 732 results in producing segment 734 and segment 736 having memory sizes 19 MB and 11 MB, respectively. The memory size of each of segment 734 and segment 736 is below the memory threshold of 20 MB. With respect to FIG. 6, System 102 proceeds to decision block 610 to check if there are two or more segments whose aggregation is below the memory threshold of 20 MB.

In FIG. 7D, there is no combination of the remaining six nodes segment 724, aggregated segment 726, aggregated segment 728, segment 730, segment 734 and segment 736, that is below the memory threshold of 20 MB. Since the answer is 'no' at decision block 610, System 102 proceeds to decision block 612, to check if a remaining segment exceeds the memory threshold of 20 MB. In FIG. 7D, none of the remaining nodes exceed the memory threshold size of 20 MB (that is, 'no' at decision block 612). As such, System 102 ends at block 606.

FIG. 7D illustrates the final segmentation of root node 704, partitioned according to three attributes, into six segments: segment 724 (size 20 MB), aggregated segment 726 (20 MB), aggregated segment 728 (10 MB), segment 730 (20 MB), segment 734 (19 MB) and segment 736 (11 MB). Segment 724, aggregated segment 726, and aggregated segment 728 are partitioned in accordance with the first attribute "distribution center", and are at a first layer of the segmentation. Segment 730 is partitioned in accordance with the second attribute "city", which is at a second layer of the segmentation. Finally segment 734 and segment 736 are partitioned in accordance with the third attribute "state", which is at a third layer of the segmentation.

Figure 8:
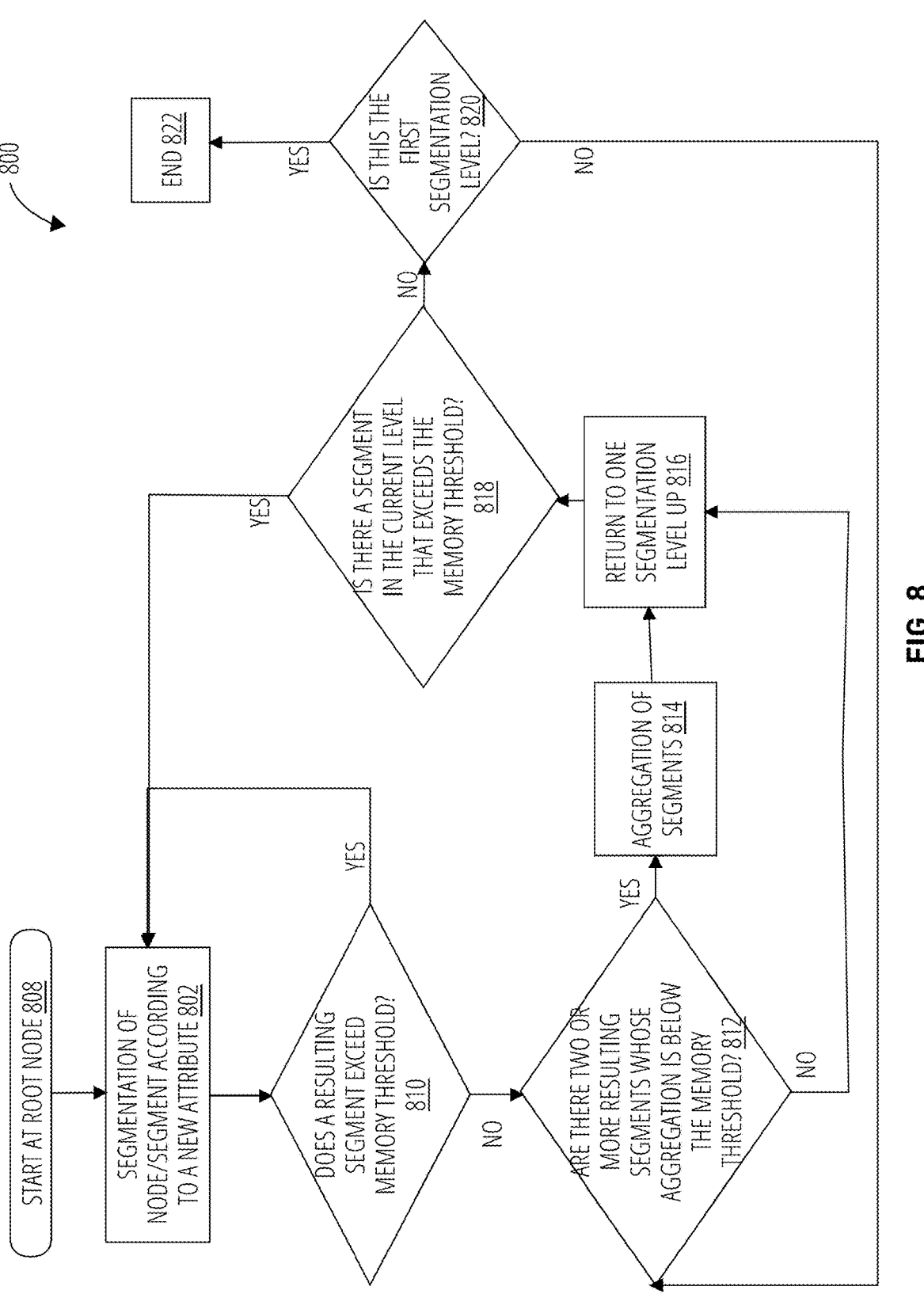
FIG. 8 illustrates a block diagram for efficient segmentation, in accordance with one embodiment.

FIG. 8 illustrates a block diagram 800 for efficient segmentation, in accordance with one embodiment. FIG. 8 illustrates an alternate way of segmenting data with respect to FIG. 6. At block 808, System 102 begins at a root node, and at block 802, System 102 segments a parent node into a plurality segments, based on an attribute.

Next, System 102 then checks to see if there are any resulting segments, obtained at block 802, that exceed the memory threshold at decision block 810. If the answer at decision block 810 is 'yes', System 102 returns to block 802 and partitions the segment according to a new attribute, until it attains a set of segments that do not exceed the pre-set memory threshold ('no' at decision block 810).

Once there is no further segmentation of the segment ('no' at decision block 810), System 102 checks to see if see if there are two or more resulting segments, whose aggregation is below the pre-set memory threshold at decision block 812. If the answer is 'yes', at decision block 812, then aggregation of segments takes place at block 814, and the process returns one segmentation level up, at block 816. If, on the other hand, the answer is 'no' at decision block 812, then the process directly returns to one segmentation level up, at block 816.

At this stage, System 102 checks to see if there is a segment (after returning to an upper segmentation level) that exceeds the memory threshold at decision block 818. If there is such a segment ('yes' at decision block 818), then System 102 returns to block 802 and proceeds until there is no segment at the current segmentation level that exceeds the memory threshold ('no' at decision block 818).

If this is the first level of segmentation ('yes' at decision block 820), then there are no more segments that exceed the memory threshold, and the program ends at block 822. On the other hand, if there are further upper levels to process ('no' at decision block 820), System 102 reverts to decision block 812 to see if there are two or more segments whose aggregation is below the memory threshold, and proceeds.

Figure 9A:
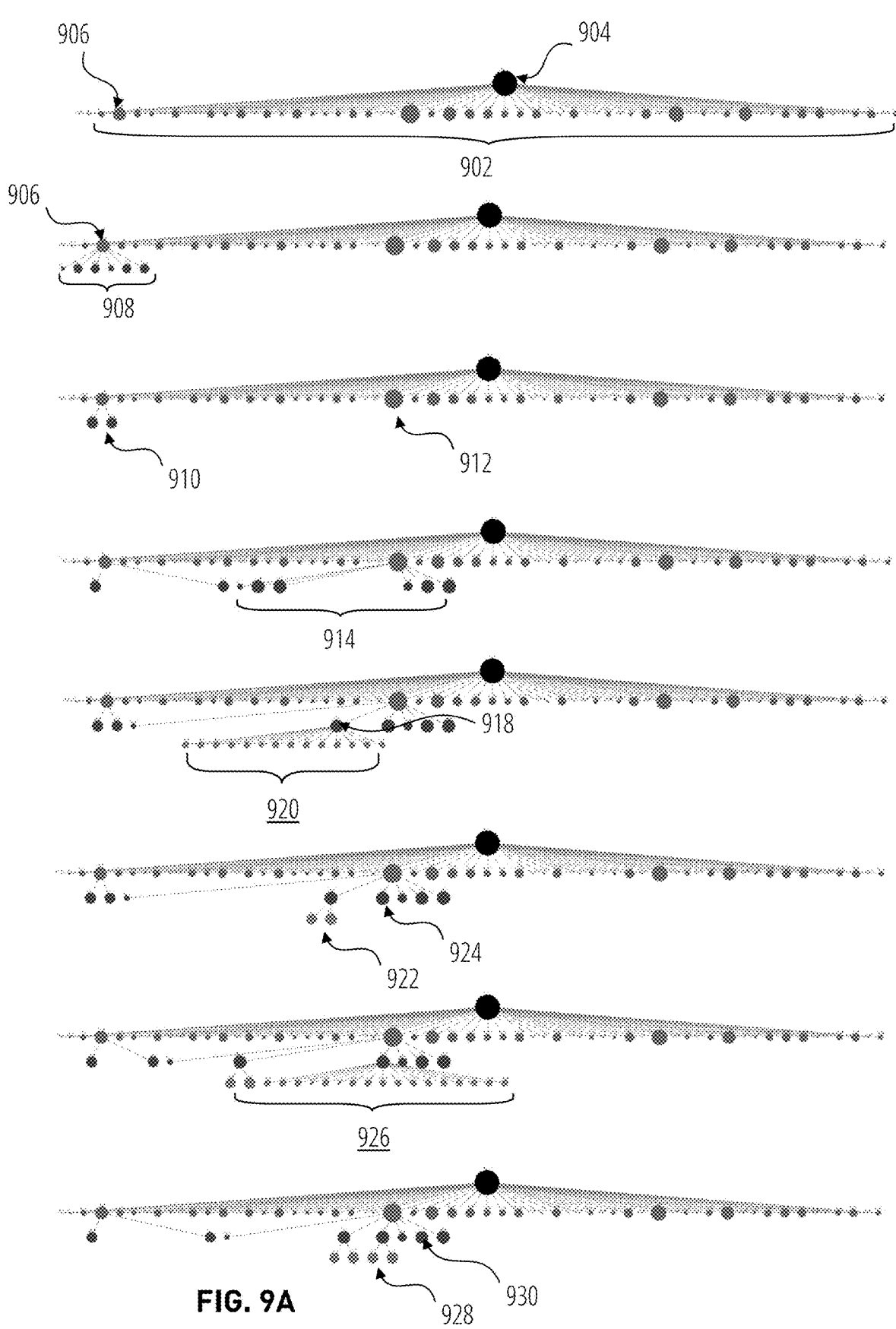
FIG. 9A illustrate step-by-step representations of efficient segmentation of customer data, in accordance with one embodiment.
Figure 9B:
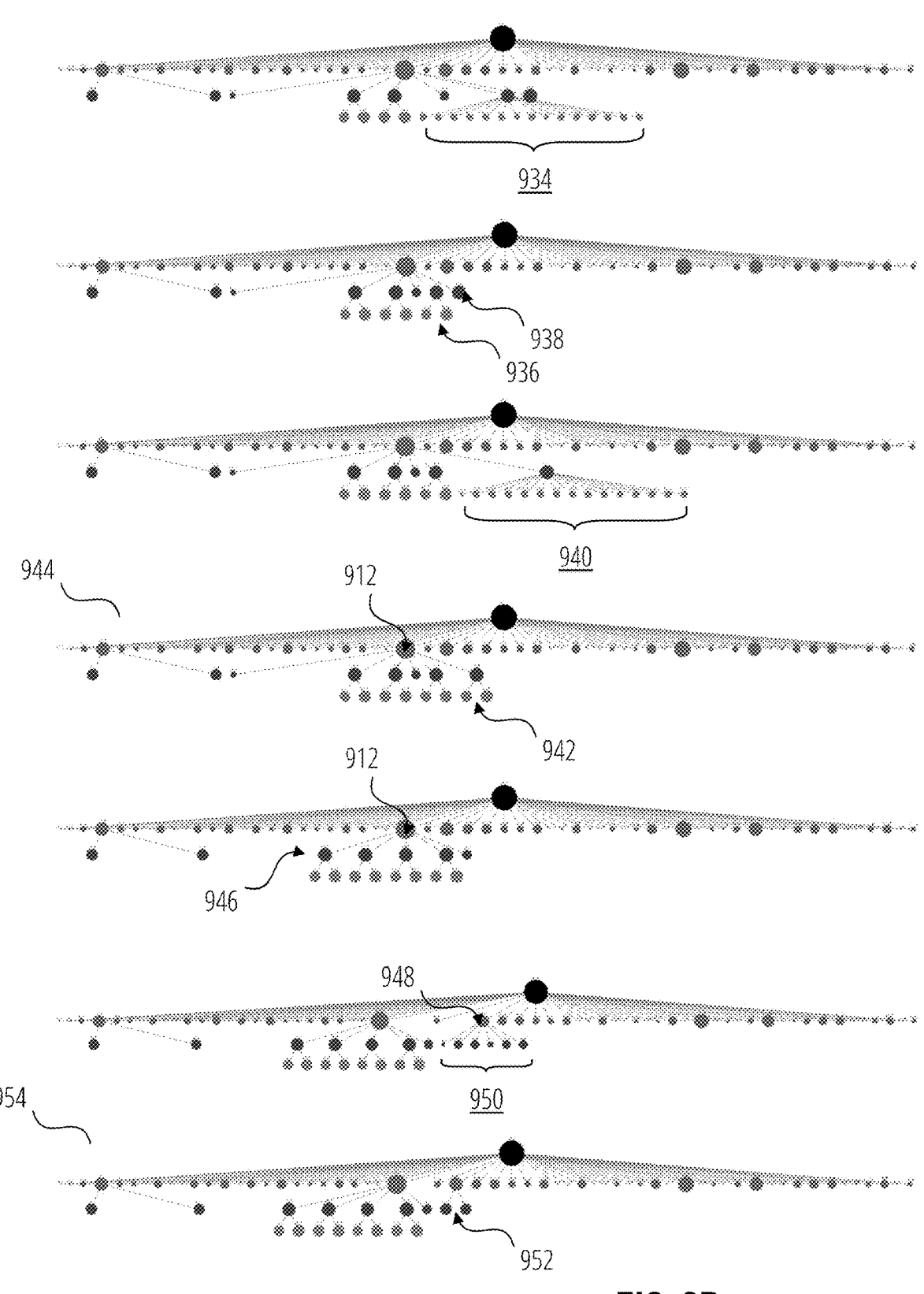
FIG. 9B is a continuation of the step-by-step visual representations illustrated in FIG. 9A.
Figure 9C:
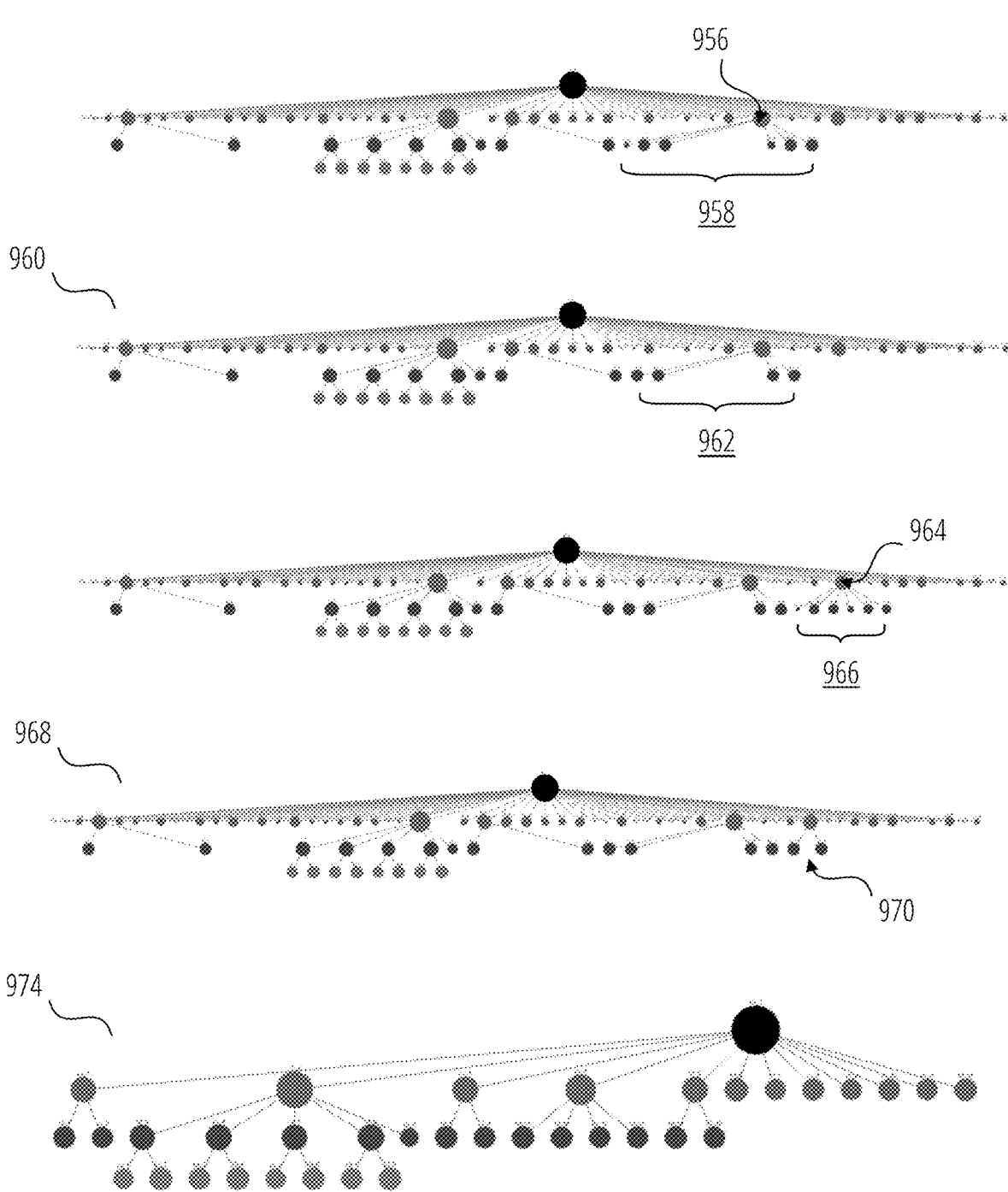
FIG. 9C is a continuation of the step-by-step visual representations illustrated in FIG. 9B.

An example of data segmentation according to block diagram 800 is illustrated in FIG. 9A-FIG. 9C.

FIG. 9A, FIG. 9B and FIG. 9C illustrate step-by-step representations of how the efficient segmentation method operates on a quick service restaurant customer data, in accordance with one embodiment.

In FIG. 9A, root node 904 exceeds a pre-set memory threshold for segmentation, resulting in a first-level segmentation at a first attribute. The resulting segmentation results in scores of first-level segments 902. In this embodiment, the system determines the size of each of the first-level segments 902, starting from the left. If the size of a first-level segment exceeds the pre-set memory threshold, then the level-1 segment is further partitioned according to a second attribute.

First-level segment 906 exceeds the memory threshold. As such, it is further partitioned according to a second attribute, into six smaller second-level segments 908. These six segments are first checked to see if any of them exceed the memory threshold, so that further segmentation can take place according to a third attribute. In this case, none of the six second-level segments 908 exceed the memory threshold limit. The six second-level segments are then checked to see if these can be aggregated into segments that do not exceed the memory threshold. The aggregation results in two second-level segments 910, each of which is below the memory threshold.

After completing the segmentation of first-level segment 906 into two second-level segments 910, the next first-level segment that exceeds the memory threshold is segment 912. First-level segment 912 is partitioned into six second-level segments 914 according to a second attribute. Each of the second-level segments 914 are checked to see if any exceed the memory threshold. Segment 918 exceeds the memory threshold, and is thus partitioned further, according to a third attribute, into a group of third-level segments 920. The third-level segments 920 are then checked to see if any exceed the memory threshold. In this example, none of the third-level segments 920 exceed the memory threshold. As such, these third-level segments 920 are aggregated such that each of the resulting aggregates do not exceed the memory threshold. The aggregation results in two third-level segments 922.

The next segment in the group of second-level segments 914 that exceeds the memory threshold is segment 924, and is thus partitioned into a group of third-level segments 926, according to a third attribute. The third-level segments 926 are then checked to see if any exceed the memory threshold. In this example, none of the third-level segments 926 exceed the memory threshold. As such, these third-level segments 926 are then aggregated such that each of the resulting aggregates do not exceed the memory threshold. The aggregation results in two third-level segments 928.

FIG. 9B is a continuation of the step-by-step visual representations illustrated in FIG. 9A.

The next segment in the group of second-level segments 914 that exceeds the memory threshold is segment 930 (shown at the bottom of FIG. 9A), and is thus partitioned into a group of third-level segments 934, according to a third attribute. The third-level segments 934 are then checked to see if any exceed the memory threshold. In this example, none of the third-level segments 934 exceed the memory threshold. As such, these third-level segments 934 are then aggregated such that each of the resulting aggregates do not exceed the memory threshold. The aggregation results in two third-level segments 936.

The next group in the group of second-level segments 914 that exceeds the memory threshold is segment 938, and is thus partitioned into a group of third-level segments 940, according to a third attribute. The third-level segments 940 are then aggregated such that each of the resulting aggregates do not exceed the memory threshold. The aggregation results in two third-level segments 942.

In summary, at this stage (marked by 944), first-level segment 912 has partitioned into six second-level segments 914 (shown in FIG. 9A), each of which has been further partitioned into third-level segments, until no further segmentation can take place. These six second-level segments 914 are now checked to see if any combination thereof can be aggregated. This is shown at 946, where the smallest two of the six second-level segments can be combined into one segment, resulting in a total of five second-level segments for first-level segment 912.

Once first-level segment 912 has been partitioned into five second-level segmented segments 946 (four of which have been further partitioned into third-level segments 922, 928, 936 and 942), the first-level segment 948 is the next segment that exceeds the memory threshold. First-level segment 948 is partitioned into five second-level segments 950. Each of these second-level segments 950 are checked to see if any exceed the memory threshold, so that further segmentation according to a third attribute can take place. In this example, none of the second-level segments 950 exceed the memory threshold. As such (as shown at 954), the five second-level segments 950, are then aggregated into two second-level segments 952, such that no further aggregation can take place. Each of the two second-level segments 952 are below the memory threshold.

Continuing the segmentation process in FIG. 9C, the first-level segment 956 is the next segment that exceeds the memory threshold. First-level segment 956 is partitioned into six second-level segments 958. Each of these second-level segment 958 are checked to see if any exceed the memory threshold, so that further segmentation according to a third attribute can take place. In this example, none of the second-level segments 958 exceed the memory threshold. As such (as shown at 960), the six second-level segments 958, can be aggregated into four second-level nodes 962, such that no further aggregation can take place. Each of the four second-level nodes 962 are below the memory threshold.

Once first-level segment 956 has been partitioned into four second-level segmented nodes 962, the first-level segment 964 is the next node that exceeds the memory threshold. First-level segment 964 is partitioned into six second-level segments 966. Each of these second-level segment 966 are checked to see if any exceed the memory threshold, so that further segmentation according to a third attribute can take place. In this example, none of the second-level segments 966 exceed the memory threshold. As such (as shown at 968), the six second-level segments 966, can be aggregated into two second-level nodes 970, such that no further aggregation can take place. Each of the two second-level nodes 970 are below the memory threshold.

Once all of the first-level nodes have been fully segmented, then aggregation of the first-level nodes takes place, resulting in the final segmentation of nodes, according to three successive attributes, shown at 974.

Figure 10:
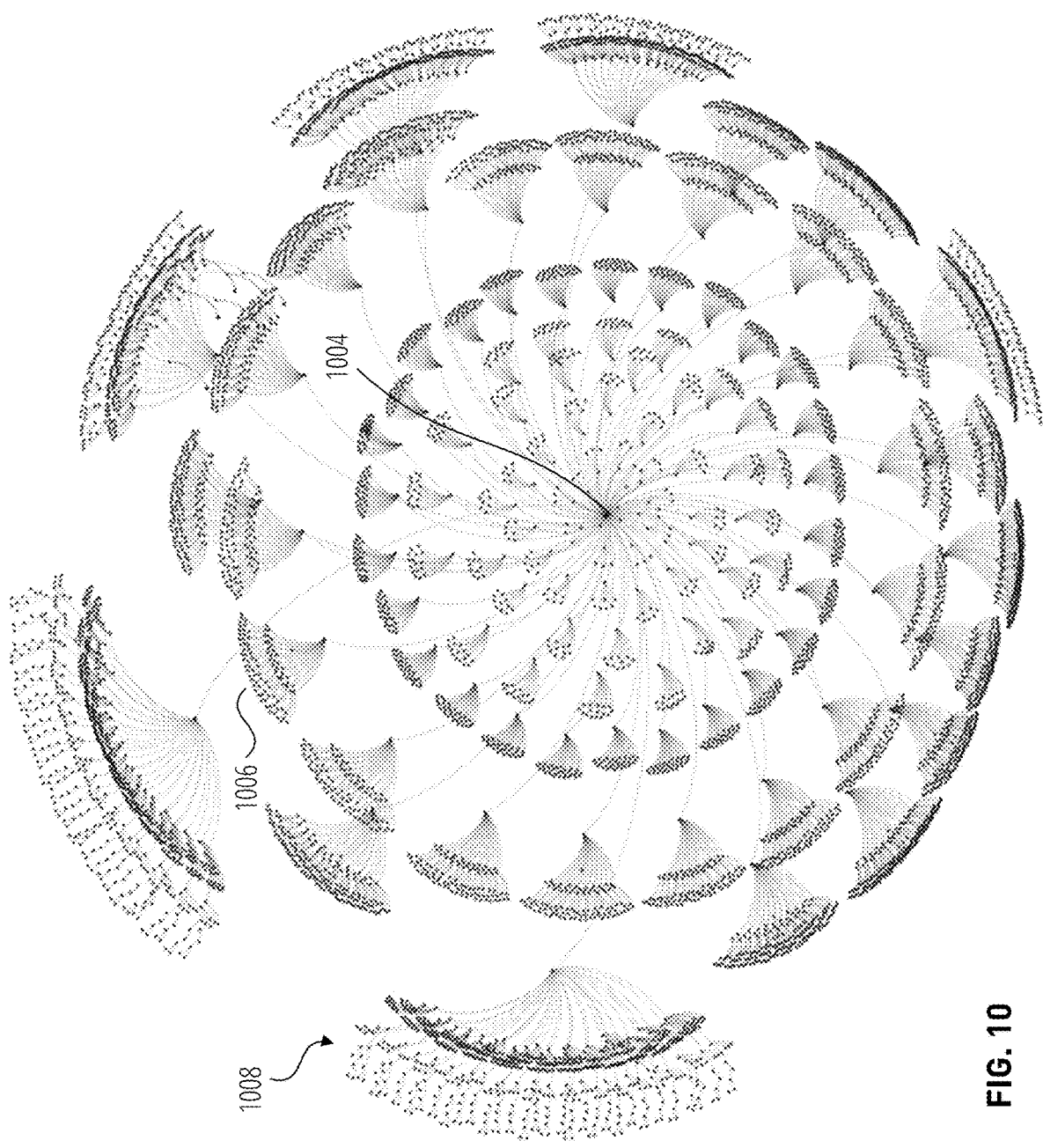
FIG. 10 illustrates an exemplary final tree built by efficient segmentation, in accordance with one embodiment.

FIG. 10 illustrates an exemplary final tree built by efficient segmentation, in accordance with one embodiment. In this example, 8 billion records are partitioned into approximately 6,000 segments. The root node is shown at 1004, in the center. Some leaves terminate at level 1, meaning only one segmentation according to one attribute, after the root node. In example 1006, the leaves terminate at level 3, meaning segmentation based on a first, second and third attribute. In example 1008, the partitioned nodes have reached level 6, meaning that segmentation has occurred according to 6 attributes given as input.

Summary of Partitioning

Partitioning large segments is done by using the input segmentation attributes. A first attribute is used to segment the root node, a second attribute is used next and so on. Therefore, each input attribute corresponds to a level in a tree. For instance, if the first attribute is distribution center ID, then all nodes at level 1 (assuming root is level 0) represent either a single distribution center or multiple distribution centers (which is the result of aggregation of nodes).

Aggregation

Aggregation of small segments reduces the total number of segments. In particular, some attributes have a high branching factor. The aggregation step can be viewed as a bin packing problem in computer science wherein segments are put into bins of fixed size (that is, configured memory limit) such that the sum of sizes of segments does not violate the memory limit (that is, bin capacity). As few bins as possible is ideal. Aggregation can be based on several metrics. Some specific and non-limiting examples of aggregation methods include: Best-fit algorithm; Entropy-based algorithm; Sales similarity based algorithm; Similarity in description of items or categories (if descriptions are provided in the data); Location proximity of the store (if latitude and longitude information is provided in the data); and Hybrid aggregation methods. A description of each of these methods is provided below.

Best-Fit Algorithm

Figure 11:
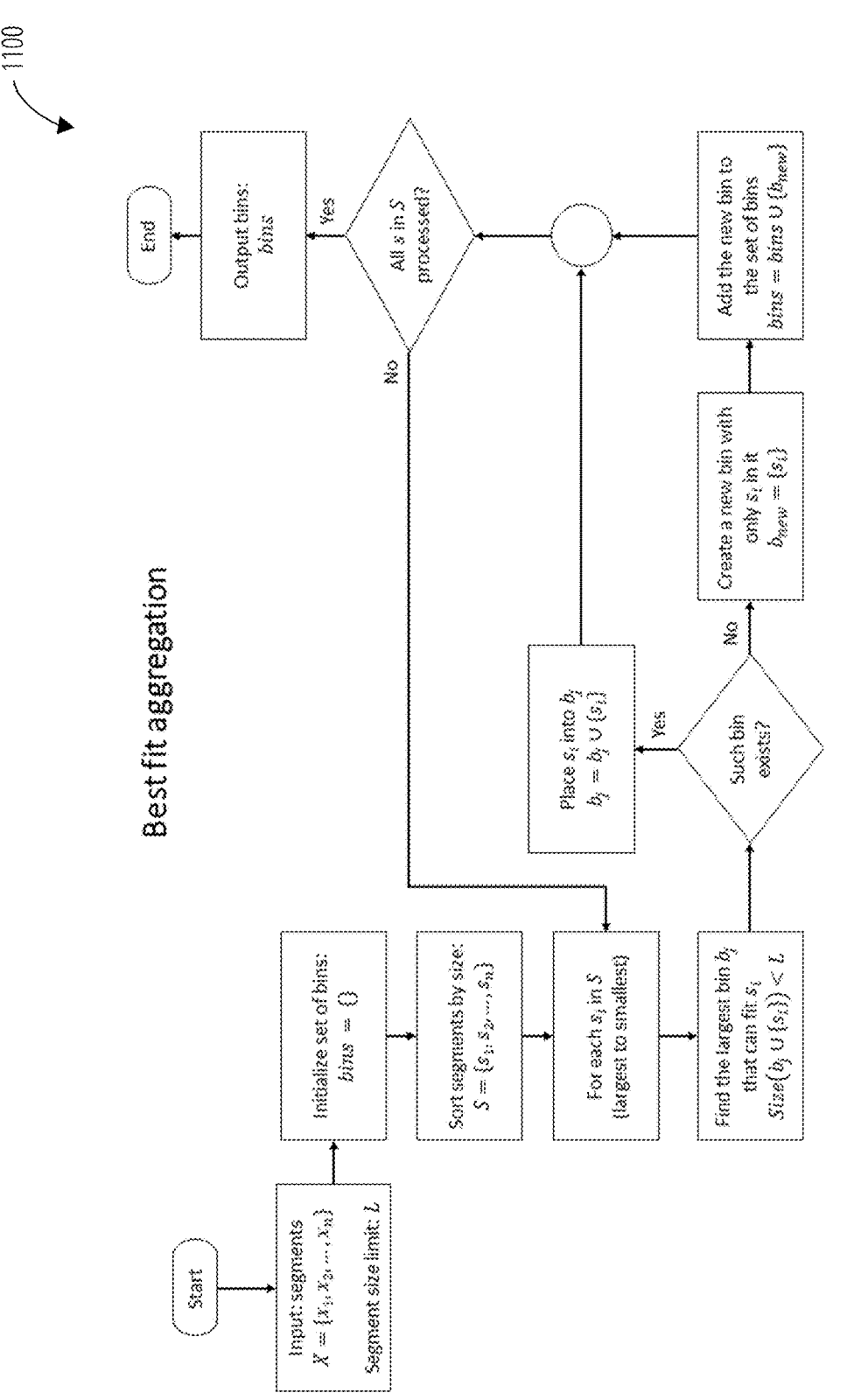
FIG. 11 illustrates a block diagram of a best-fit aggregation process, in accordance with one embodiment.

FIG. 11 illustrates a block diagram of a best-fit aggregation process, in accordance with one embodiment.

A best-fit aggregation process only considers memory usage and resource utilization. This process tries to create segments that are closest to the limit in size. Given a list of segments to be aggregated, the implementation of a best-fit process includes, keeping a list of open bins, which is initially empty, sorting segments under consideration from largest to smallest, for each segment in the sorted order (from largest to smallest), finding the bin with the maximum records into which the segment can fit, if any. If such a bin is found, place the segment inside it. Otherwise, create a new bin and place the segment inside of the new bin.

A Best-fit algorithm is a greedy algorithm and often results with the lowest number of segments among other aggregation methods. For example, if there are 3 segments with sizes 20, 30, 60 with the memory limit of 80, then the best-fit will aggregate 60 and 20 and result in 2 segments of 30, 80.

Entropy-Based Algorithm

Figure 12:
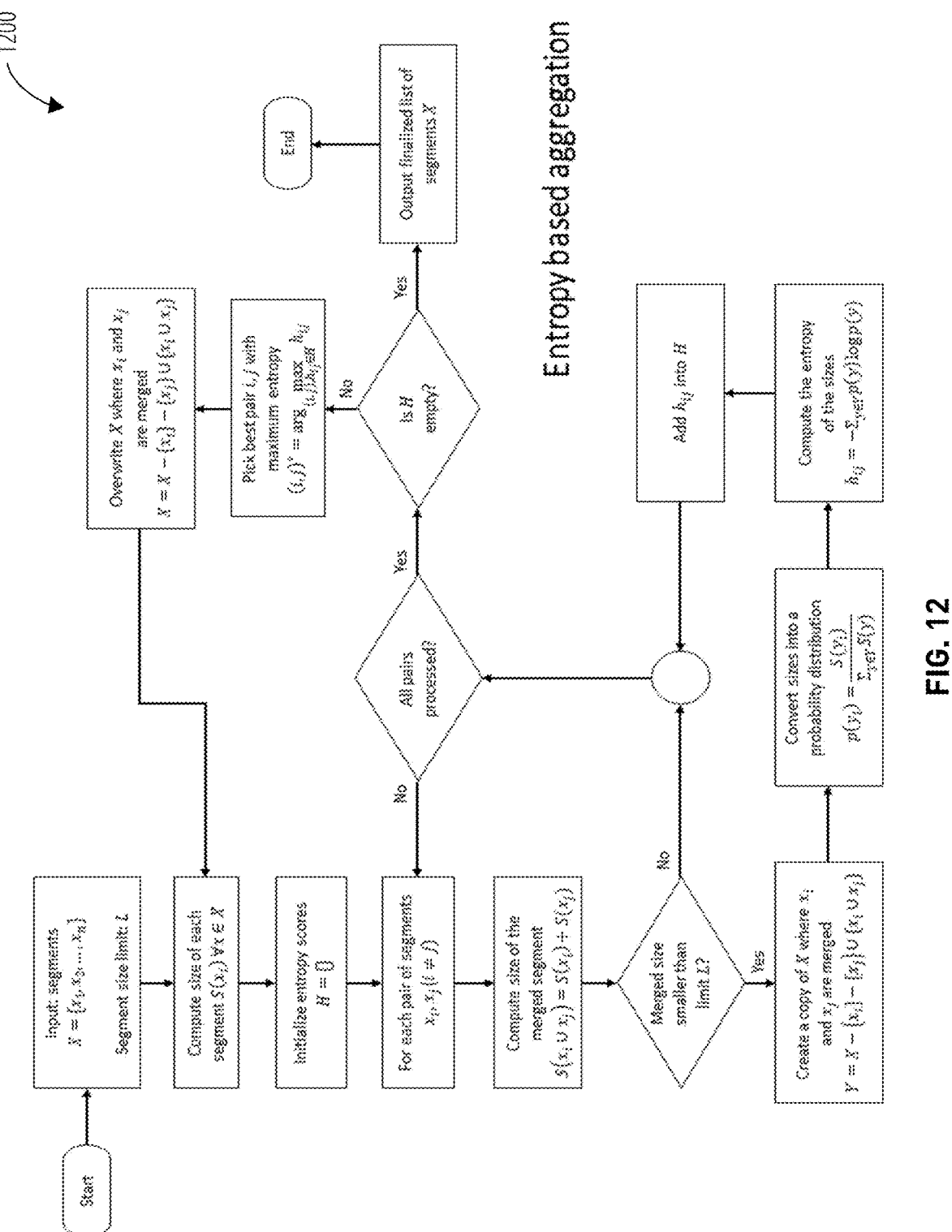
FIG. 12 illustrates a block diagram of an entropy-based aggregation process, in accordance with one embodiment.

FIG. 12 illustrates a block diagram 1200 of an entropy-based aggregation process, in accordance with one embodiment.

An entropy-based algorithm considers memory usage and resource utilization. This algorithm maximizes the uniformity of segment sizes rather than making the segments as close to the limit as possible. For example, for 3 segments with sizes 20, 30, 60 with the memory limit of 80, then the entropy based method will aggregate 30 and 20 and result in 2 segments of 50, 60.

Given a list of segments to be aggregated, the implementation of entropy based algorithm includes: Repeating the following until no aggregation can be made: For each pair of segments i and j (i≠j):

Compute the size of the merged segment: $s(i \cup j) = s(i) + s(j)$

Convert segment sizes into a probability distribution after the hypothetical merge:

$$p(x) = \frac{s(x)}{\sum_{x \in X} s(x)}$$

Definition: s(x) is the size of segment x.

Compute the entropy of the sizes: $H = -\sum_{x \in X} p(x) \log p(x)$

Pick the pair of segments i, j that had the maximum entropy among all pairs and merge them.

Sales Similarity-Based Algorithm

Figure 13:
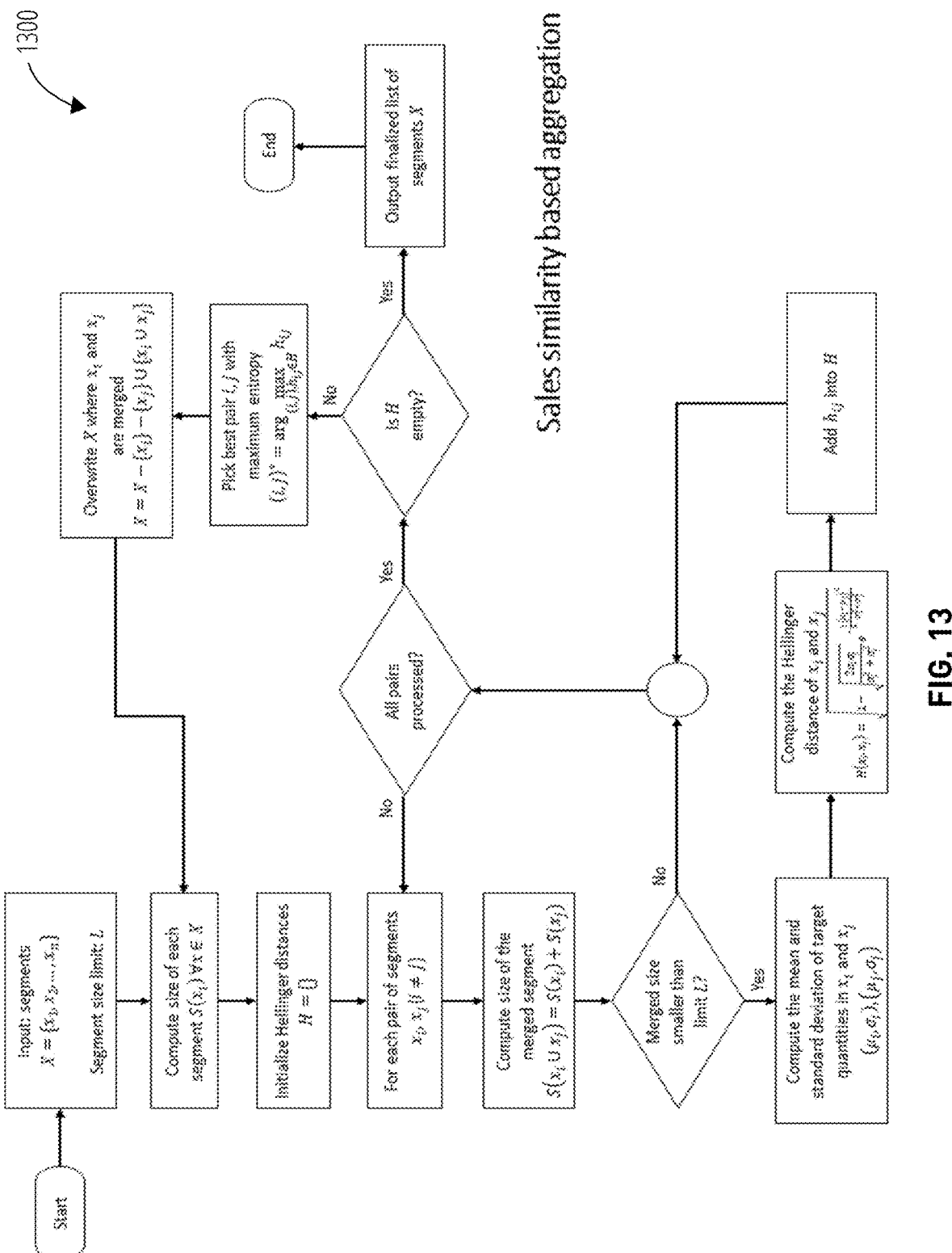
FIG. 13 illustrates a block diagram of a sales similarity-based aggregation process, in accordance with one embodiment.

FIG. 13 illustrates a block diagram 1300 of a sales similarity-based aggregation process, in accordance with one embodiment. A sales-similarity based algorithm incorporates sales similarity between items within segments, with an objective of achieving higher accuracy forecasts. Aggregating segments purely based on memory and resource utilization may result in aggregating unrelated items or locations within the merged segment. However, grouping similar item locations can potentially result in better predictions since there may be more commonalities and the patterns can be generalized with greater ease within the segment.

There are various metrics based on sales similarity and can be used to pick the best merge candidates. Since each segment is already a group of forecast items (item locations or time-series) similarity can be analyzed in many different ways. For example, a first segment can contain 150 item locations, while a second segment has 220 item locations. Some specific and non-limiting ways to analyze similarity includes, computing the mean of each individual time-series and model sales of the segment as a normal distribution (or Poisson distribution or any other distribution) of the means, computing the median of each individual time-series and model sales of the segment as a normal distribution (or Poisson distribution or any other distribution) of the medians, modelling sales of each segment as a normal distribution (or Poisson distribution or any other distribution) of all sales vales of all time-series, and modelling sales of each time-series as a normal distribution (or Poisson distribution or any other distribution), then sales of each segment can be modelled like a distribution of distributions.

Once the sales of a segment is modelled as a distribution, distribution similarity (or distance) metrics can be used to compute how similar the sales of segments are in order to pick the best merge candidate. Specific and non-limiting distribution similarity/distance metrics include, Kullback-Leibler divergence, Jensen-Shannon divergence (also known as information radius—IRad), Kolmogorov-Smirnov distance, Bhattacharyya distance and Hellinger distance.

Given a list of segments to be aggregated, implementation of a sales-based aggregation process includes: Repeating until no aggregation can be made:

Compute the global mean and standard deviation of sales within each segment: $\mu_s$, $\sigma_s \forall s \in S$;

For each pair of segments i and j ($i \neq j$): Compute Hellinger distance (or any other) between the two distributions:

$$H(s_i, s_j) = \sqrt{1 - \sqrt{\frac{2\sigma_i\sigma_i \exp\left|\frac{-[\mu_i - \mu_j]^2}{4[\sigma_i^2 + \sigma_j^2]}\right|}{[\sigma i^2 + \sigma j^2]}}}$$

And pick the pair of segments i, j that had the minimum distance among all pairs and merge them.

Similarity in Description of Items or Categories Technique

The similarity in description of items or categories technique uses the similarity of item descriptions or category descriptions to find the best merge candidate. Each segment is a combination of forecast items which means a combination of items or potentially combination of categories. Descriptions can be vectorized into numerical vectors and then the similarity of segments can be computed based on similarity of items between segments. The similarity and distance are inversely correlated, higher similarity means lower distance and vice versa. Maximum distance means minimum similarity and so on. For distance one can use Euclidean distance and for similarity one can use Cosine similarity. Herein, distance can be considered similarity and vice versa.

Specific and non-limiting techniques used to vectorize the item and category descriptions includes, Bag-Of-Words (BOW) representation, TF-IDF vectorization, pre-trained word embeddings such as word2vec, GloVe, etc., and description embeddings using language models and LLMs.

Once all descriptions are vectorized, the similarity of segments can be computed. Specific and non-limiting techniques for computing similarity of segments includes, single linkage, the distance of two segments is defined as the minimum distance between any of their items (that is, the most similar pair): dist(u,v)=min(dist($u_i$,$v_j$)) where $u_i$ are items in segment u and $v_j$ are items in segment v, complete linkage, the distance of two segments is defined as the maximum distance between any of their items (that is, the least similar pair): dist(u,v)=max (dist($u_i$,$v_i$)) where $u_i$ are items in segment u and $v_j$ are items in segment v, centroid linkage, Compute the average embedding for each segment and compute the distance between the two segments as the distance between the average embeddings of them: dist(u, v)=$\|c_u - c_v\|_2$ where $c_u$ and $c_v$ are the centroids for segments u and v and $\|.\|_2$ is the Euclidean distance. As described previously this can be defined based on Cosine similarity as well, average linkage: Compute the pairwise distance between items of segments which results in a distance matrix. Then compute the distance between segments as the average of pairwise distances of their items:

$$dist(u, v) = \frac{\sum_{i,j} dist(u_i, v_j)}{|u||v|}$$

where $u_i$ are items in segment u and $v_j$ are items in segment v, and median linkage: Compute the pairwise distance between items of segments which results in a distance matrix. Then compute the distance between segments as the median of pairwise distances of their items.

Location Proximity Technique

The location proximity of the store technique is similar to the description of the similarity technique, but on locations rather than items. If the geo location information (latitude and longitude) exists in data it may be used to compute the similarity or proximity of locations. The premise is that locations that are close together will exhibit similar patterns and will have similar seasonalities and sales patterns.

As each segment is a combination of locations, the linkage methods described above for location based similarity of segments can be used, including: Single Linkage, the distance of two segments is defined as the minimum distance between any of their locations (that is, the closest pair of locations): dist(u,v)=min(dist($u_i$,$v_j$)) where $u_i$ are locations in segment u and $v_j$ are locations in segment v, Complete Linkage, the distance of two segments is defined as the maximum distance between any of their locations (that is, the furthest pair of locations): dist(u,v)=max(dist ($u_i$,$v_j$)) where $u_i$ are locations in segment u and $v_j$ are locations in segment v, Centroid Linkage, compute the average/centroid location for each segment and compute the distance between the two segments as the distance between their average/centroid locations: dist(u,v)=$\|c_u - c_v\|_2$ where $c_u$ and $c_v$ are the centroids for segments u and v and $\|.\|_2$ is the Euclidean distance, Average Linkage, Compute the pairwise distance between locations of segments which results in a distance matrix. Then compute the distance between segments as the average of pairwise distances of their locations:

$$dist(u, v) = \frac{\sum_{i,j} dist(u_i, v_j)}{|u||v|}$$

where $u_i$ are locations in segment u and $v_j$ are locations in segment v.

Median Linkage, Compute the pairwise distance between locations of segments which results in a distance matrix. Then compute the distance between segments as the median of pairwise distances of their locations.

Hybrid Aggregation

Finally, hybrid aggregation methods includes combining any of the aggregation methods described above.

In a first example, each algorithm provides a numerical score for each candidate pair (that is, based on distance of segments), then combine the scores in weighted manner to get the overall score. Finally the candidate pair that has the best overall score is selected.

$$S_{ij} = \frac{\sum_{k=1}^{n} w_k A_{ij}^k}{\sum_{k=1}^{n} w_k}$$

where $A^k_{ij}$ is the score that k-th algorithm gives to the pair of segments i and j, and $w_k$ is the weight associated to the k-th algorithm, and $S_{ij}$ is the final score computed for the same pair.

In a second example, each algorithm provides a ranking of candidate pairs. The ranking can be computed by sorting the distance values of pairs and ordering them from best candidate to worse candidate. This basically ignores the distance magnitude and only considers the rank in the sorted order ($1^{st}$, $2^{nd}$, $3^{rd}$, $4^{th}$, . . . , $n^{th}$). Then ranks are combined and the pair based on the best overall rank is picked. Rank aggregation can be done with a simple sum rank, weighted rank, or more complex methods.

$$R_{ij} = \sum_{k=1}^{n} r_{ij}^k$$

where $r^k_{ij}$ is the rank that k-th algorithm gives to the pair of segments i,j, and $R_{ij}$ the sum rank that can be ordered to get the final rank. The pair with the best final rank is selected.

Figures 14, 15:
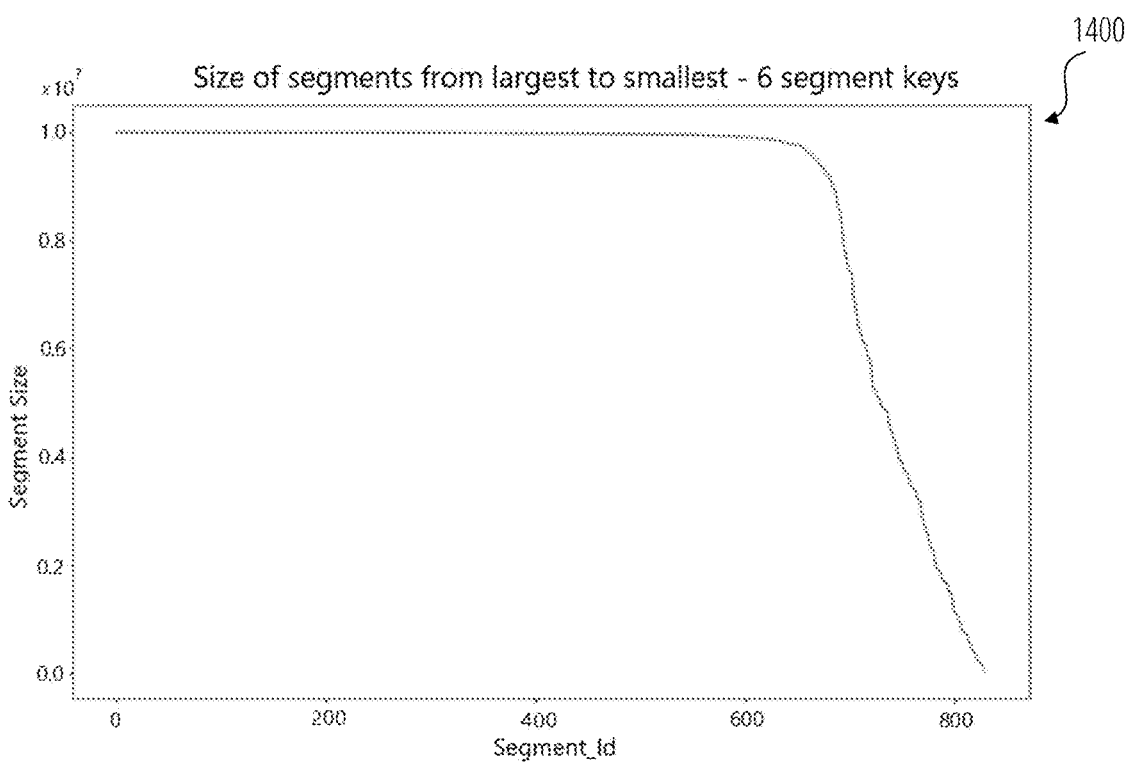
FIG. 14 is a chart illustrating the distribution of segment sizes resulting from efficient segmentation using a best-fit algorithm, in accordance with an embodiment.
FIG. 15 is a table that summarizes the gains achieved with efficient segmentation on a dataset with 8 billion records, in accordance with an embodiment.

Now referring to FIG. 14, which is a chart 1400 illustrating the distribution of segment sizes resulting from efficient segmentation using a best-fit algorithm, in accordance with an embodiment. The maximum limit for a segment was set to 10,000,000 rows. Approximately 80% of the segments are extremely close to 10,000,000 rows. This is a suitable situation for parallelization and maximizes the efficiency of the end-to-end run.

FIG. 15 is table 1500 of results that shows the gains achieved with efficient segmentation on a quick service restaurant (QSR) dataset with 8 billion records, in accordance with an embodiment. Section 1502 shows run results for naïve segmentation using all six attributes, and section 1504 shows run results for efficient segmentation. The processing configuration was the same for Naive Segmentation and efficient segmentation. Naïve segmentation results in 1,200,000 segments while efficient segmentation results in ~6,000 segments. Section 1506 shows speedup gains and storage reduction achieved by implementation of efficient segmentation.

Efficient segmentation reduced the time it takes to generate features from 11 hours and 20 minutes down to 4 hours and 11 minutes on the exact same cluster size of 20 nodes of D64 (64 CPU cores with 256 GB memory). This translates to 2.71× speedup on each feature generation run, as shown in section 1506 of Table 1500.

This improvement in compute time for features generation mostly comes from the final partitioning of the data and saving the partitions as parquet files. Efficient segmentation reduces the number of segments from 1,200,000 to 6,000. Therefore, instead of writing 1,200,000 of mostly tiny parquet files, only 6,000 roughly equal-size large parquet files are written. Also, writing larger parquet files allows for a more efficient compression on the parquet files, so 1.96× storage reduction on FG was observed—meaning the total size of output artifacts are 1.96× smaller with efficient segmentation, from 388 GB to 197 GB, as shown in table 1500.

Efficient segmentation also reduced the time it takes to train models from 59 hours and 25 minutes on 35 nodes of D64 down to 9 hours and 26 minutes on 30 nodes of D64. In terms of CPU hours, which is down from 133,093 to 18,112, which translates to 7.34× speedup for each training run, as shown in table 1500.

This improvement on training comes from comes from two main factors: 1) training 6,000 large machine models is more efficient than training 1,200,000 small machine learning models; 2) serializing 1,200,000 machine learning models takes a lot more storage compared to 6,000 machine learning models. Each machine learning model used, takes almost constant 5 MB size, regardless of how many records the machine learning model was trained on. Therefore, serializing 1,200,000 machine learning models resulted in 6.2 TB storage usage, as opposed to serializing 6,000 segments from efficient segmentation which only took 42 GB storage. This is 148× reduction in storage, as shown in section 1506 of FIG. 15.

Efficient segmentation reduced the time it takes to run inference from 60 hours down to 1 hour and 10 minutes on the same exact number of 30 nodes of D64. This translates to 51.42× speedup on each inference run, as shown in section 1506 of FIG. 15.

This improvement on training comes from comes from two main factors: 1) reading and deserializing 1,200,000 machine learning models and feature sets takes much longer than the 6,000 counterpart, 2) writing and serializing 1,200, 000 sets of forecast outputs takes a lot more time and storage compared to 6,000 sets of forecast outputs. This means fewer parquet files in the output. And once again, since there are larger parquet files written, the compression becomes more efficient, and reduces the inference output size from 186 GB to 122 GB. This is 1.52× storage reduction, as shown in section 1506 of FIG. 15.

Enhanced Efficient Segmentation

In the efficient segmentation method described above, the partitioning stops dynamically whenever the segment size (of all segments) falls below a reasonable memory threshold. However, the list of attributes that are used for partitioning, are prioritized arbitrarily beforehand.

Disclosed herein is an automated way of selecting the best attributes for partitioning and the order in which the attributes should be used, according to certain objectives. The methods and systems disclosed herein result in a partitioning that is both efficient and accurate. That is, the machine learning models that are trained on these partitions are more accurate than other partitioning.

The larger the variations within the data, the more data points are needed to effectively train a machine learning model. Therefore, when the segmentation of the data takes place, it is preferable to partition in such a way as to reduce the amount of variation within each of the ensuing segments (or splits). As an example, if machine learning is used to forecast the sales of products, it is better to group products with similar sales volume in the same bucket that is used to train the machine learning model. This results in the gradients and errors of the machine learning model to be in the same range and thus prevents errors of large items overshadowing errors of smaller items.

A variance reduction metric may be used to compute the amount of gain (that is, reduction of variance) achieved by each split on the data. The systems and methods disclosed herein are designed to achieve the most reduction with the least number of splits. Having fewer splits results in having fewer segments and therefore, less overhead of training machine learning models, along with better parallelization efficiency, and therefore more efficient computations. Having the most reduction in variance can also help to achieve better prediction accuracy by the machine learning models. The methods and systems disclosed herein are designed to achieve these two goals by finding the splitting attributes that provide the most variance reduction with the least number of splits. This combination is referred to as "enhanced efficient segmentation".

Given a candidate list of attributes, the methods and systems disclosed herein determine a ranking of attributes which provides the order in which they should be used for data partitioning. A greedy forward selection approach can be used for selecting the attributes. In this forward selection strategy, the starting point is an empty list, followed by selection of the first best key, which is the key with the single most reduction in variance after a first segmentation. This first best key is added to the list. The second best key is then selected as the key that provides the most reduction in variance following a second subsequent segmentation of the data. Basically, at each round of segmentation, the next best key is found, and appended to the list. The process continues until there is either: no reduction in variance achieved, or the candidate list of key is exhausted, or if the largest segment given the current splits is smaller than a maximum memory threshold (that is, all segments are small enough to fit in memory can thus be feasibly used to train machine learning models).

Outline of Elements for Enhanced Efficient Segmentation

A few elements of enhanced efficient segmentation may include:

Input data that contains a target column, multiple categorical attributes (suitable for splitting). and optionally, other numerical or categorical features. The target column refers to the entity that is to be forecasted by machine learning.

The variance, at each stage of segmentation, is computed on the target column. Variance can be computed on any subset of data, as follows:

$$\mathrm{var}(x) = \frac{1}{n} \sum_{i=1}^{n} (x_i - \overline{x})^2,$$

where $\{x_i, i=1, \ldots, n\}$ is a set of target values for the 'n' data points, and $\overline{x}$ is the average of the target values for the 'n' data points.

Each combination of keys defines a level in the tree, which is achieved by a full group by (full partitioning) on those keys. As an example, an attribute $k_1$ has 3 unique values in the data and $k_2$ has 5 unique values. Then splitting data by both $k_1$ and $k_2$ can results in up to 15 groups. Therefore, the key combination $<k_1, k_2>$ defines a level which contains all those combinations of values.

The number of rows and the variance inside each group can be different. The variance at a given segmentation level is defined as the weighted average of variances of all the groups in that level. The weighting is based on the number of rows in each group.

The variance gain (or simply the "gain") for splitting by a key $k_i$ can be calculated as the difference between the variance at the parent level (before splitting by $k_i$) and variance at the children level (after splitting by $k_i$).

A growth factor of a key $k_i$ can be calculated as the number of nodes after the split is completed, divided by the number of nodes at the parent level (that is, before the split).

The gain can be normalized by the growth factor of the splitting key. This means computing the average gain per branch, instead of total gain. This helps in regularizing the number of segments and preferring those keys that give the same or even slightly less reduction but with a lot fewer segments.

In addition, if, for example, three statistics can be computed at the lowest level (that is, the level that represents a group by all of the keys), then the variance at any higher level can be obtained very efficiently based on those statistics. Those statistics may include: count in each group; sum of target values; and sum of squares of target values. This is obtained from the following equation for the variance, in terms of an expectation function E:

$$\mathrm{var}(X) = E\left[X^2\right] - E[X]^2$$

Expectation E is basically an average that can be computed by dividing the sum by the count. Therefore, the three statistics at the bottom-most level of the segmentation are sufficient to compute the variance at any level. This allows the process to operate very efficiently on very large datasets. For instance, given a dataset of 10 billion rows, grouping by all categorical attributes can result in about 1 million groups, which is a 10000× reduction on the size of dataframe. Basically, in each round of segmentation, instead of computing variances on 10 billion rows, the variances can instead be obtained based on the statistics of the 1 million groups—which is computationally over one thousand times faster.

Outline of Steps for Enhanced Efficient Segmentation

Inputs of the process to the algorithm can include the dataset and a list of keys/attributes suitable for partitioning. The dataset also contains a target column (that is, the quantity being forecasted by the machine learning models).

Step 1: Initialize an empty list of selected keys, and a set of remaining keys equal to the initial pool of keys.

Step 2: Compute the variance at the global level (that is, the entire dataset).

Step 3 (optional for faster compute): Perform a full partitioning by all keys and compute 3 keys statistics (count, sum(target) and sum(target$^2$)) at the bottom-most level of the segmentation.

Step 4: For each key in the remaining set, compute the variance reduction gain as the difference between variance at a parent level (before split) and variance at the child level (after split). If step 3 is included, this can be executed very efficiently based on the statistics of the bottom-most level of the segmentation.

Step 5 (optional for efficient segmentation): Normalize gains for each key by its growth factor. That is, convert total gain into average gain per branch.

Step 6: Find the splitting key that provides the maximum gain.

Step 7: Add the best key to the selected keys and remove it from the remaining set.

Step 8: If, based on the current selected keys, either: the largest segment is smaller than a memory threshold; or the best gain is smaller than a gain threshold; or the input list of candidate keys is exhausted; then stop the process, otherwise go to step 4.

Step 9: Output: the ordered list of selected keys that are optimal for partitioning both for efficiency and accuracy. The ordered list of selected keys can then be used for efficient segmentation as described above.

Figure 16:
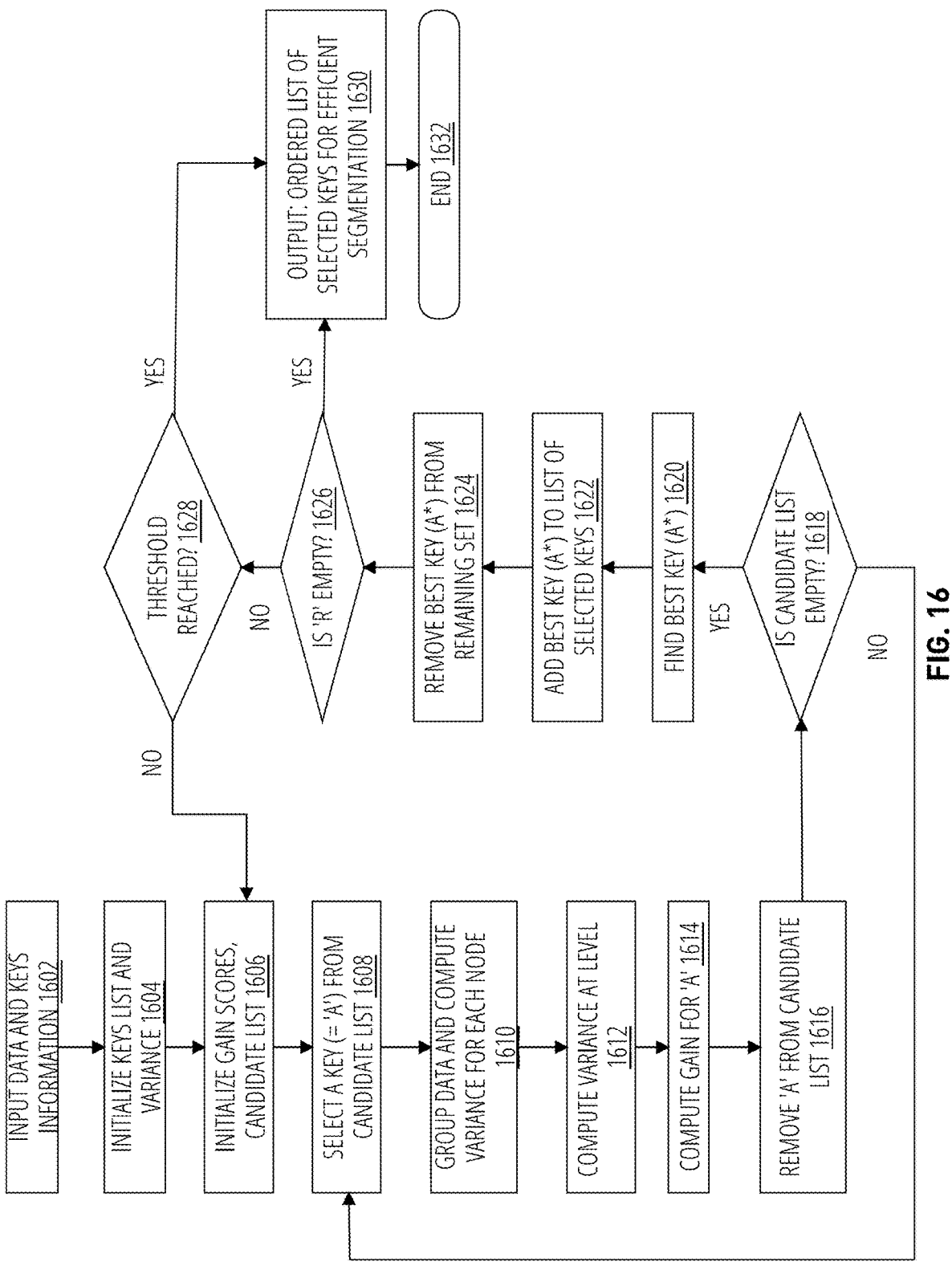
FIG. 16 illustrates a block diagram for enhanced efficient segmentation in accordance with one embodiment.

FIG. 16 illustrates a block diagram for enhanced efficient segmentation in accordance with one embodiment.

At block 1602, input of information takes place, including the following input: data D and a list of keys/attributes for partitioning P. D also includes a target column and one column for each key in P. Next, at block 1604, initialization takes place. This can include a list of selected keys: K=[ ], a set of remaining keys: R=P; and the variance of target column in D: V=var(target). A block 1606, an empty dictionary of gain scores 'g', is initialized, along with a candidate list C=R. At block 1608, a key (denoted by 'A') is selected from the candidate list C. Next, at block 1610, data is grouped by K∪{A} and the variance is computed for each node. At block 1612, the variance at level K∪{A} is computed as a weighted average of variances of the nodes. The gain for 'A' is then computed at block 1614, as the amount of reduction in variance by splitting on 'A':

$$g(A) = \text{var}(K) - \text{var}(K \cup \{A\})$$

At block 1616, 'A' is removed from the candidate list: C=C−{A}. If the candidate list C is not empty ('no' at decision block 1618), the process reverts to selecting a key at block 1608.

Once the candidate list is exhausted ('yes' at decision block 1618), the key that provides the best gain (A*) is selected at block 1620:

$$A^* = \arg \max_A g(A).$$

Once the best key, A*, is found, it is added to the list of selected keys at block 1622:

$$K = K \cup \{A^*\}.$$

Thereafter, the best key, A*, is removed from the remaining set at block 1624:

$$R = R - \{A^*\}.$$

If there are no more keys in the remaining set 'R' ('yes' at decision block 1626), then an ordered list of selected keys 'K' is output for use in efficient segmentation at block 1630, and the process ends at 1632.

If, on the other hand, the remaining set 'R' is not empty ('no' at decision block 1626), then there can be a threshold test to see if the current segmentation should stop ('yes' at 1628), or proceed with further segmentation ('no' at 1628). For example, the threshold test at 1628 can be related to the memory size of the largest node at the current level:

$$\text{Is largest node at level } K < \text{threshold memory size?}$$

Or, for example, the threshold test at 1628 can be related to the gain in variance reduction:

$$\text{Is } g(A^*) < \text{threshold gain?}$$

There may be other threshold conditions at play. If the threshold condition is met at 1628 ('yes' at 1628), then there is no further segmentation necessary, and an ordered list of selected keys 'K' is output for use in efficient segmentation at block 1630, and the process ends at 1632. On the other hand, if the threshold condition is not satisfied ('no' at 1628), then there is further segmentation, starting at block 1606, and the process is repeated iteratively until the process ends at 1632.

Figure 17:
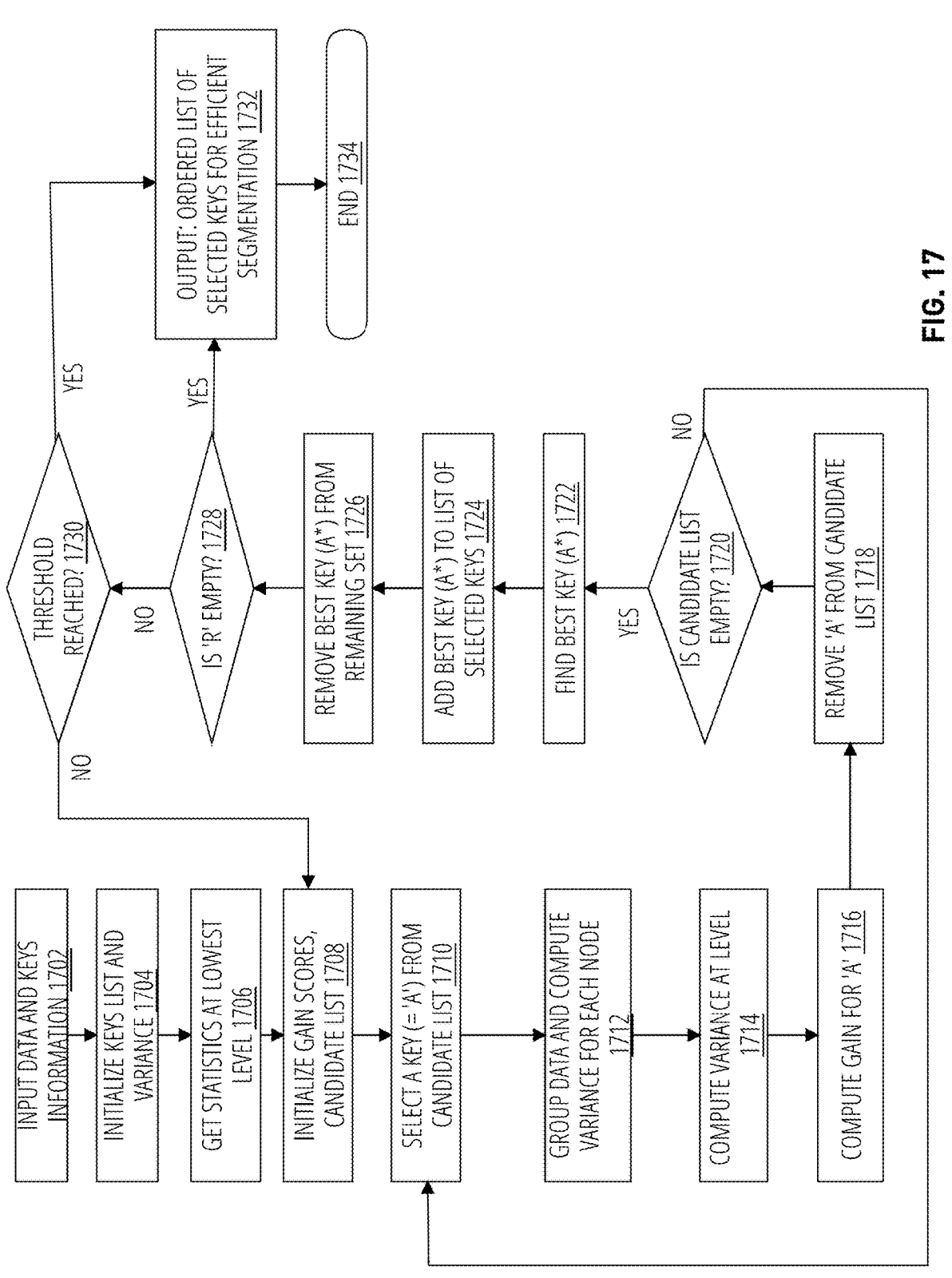
FIG. 17 illustrates a block diagram for enhanced efficient segmentation in accordance with one embodiment.

FIG. 17 illustrates a block diagram for enhanced efficient segmentation in accordance with one embodiment. FIG. 17 is similar to that of FIG. 16, except for the inclusion of block 1706, which is an embodiment of option Step 3 described above.

At block 1702, input of information takes place, including the following input: data D and a list of keys/attributes for partitioning P. D also includes a target column and one column for each key in P. Next, at block 1704, initialization takes place. This can include a list of selected keys: K=[ ], a set of remaining keys: R=P; and the variance of target column in D: V=var(target).

Block 1706 refers to optional Step 3 (described above) for faster compute, in which a full partitioning by all keys is performed and three keys statistics (count, sum(target) and sum(target²)) are computed at the bottom-most level of the segmentation. The data can be grouped by all keys in P, while count, sum(target), sum(target²) is computed for each group.

At block 1708, an empty dictionary of gain scores 'g', is initialized, along with a candidate list C=R. At block 1710, a key (denoted by 'A') is selected from the candidate list C. Next, at block 1712, data is grouped by K∪{A} and the variance is computed for each node. Since block 1706 is now included, block 1712 can be executed very efficiently based on the statistics of the bottom-most level of the segmentation.

At block 1714, the variance at level K∪{A} is computed as a weighted average of variances of the nodes. The gain for 'A' is then computed at block 1716, as the amount of reduction in variance by splitting on 'A':

$$g(A) = \text{var}(K) - \text{var}(K \cup \{A\}).$$

Next, at block 1718, 'A' is removed from the candidate list: C=C−{A}. If the candidate list C is not empty ('no' at decision block 1720), the process reverts to selecting a key at block 1710.

Once the candidate list is exhausted ('yes' at decision block 1720), the key that provides the best gain (A*) is selected at block 1722:

$$A^* = \arg \max_A g(A).$$

Once the best key, A*, is found, it is added to the list of selected keys at block 1724:

$$K = K \cup \{A^*\}.$$

Thereafter, the best key, A*, is removed from the remaining set at block 1726:

$$R = R - \{A^*\}.$$

If there are no more keys in the remaining set 'R' ('yes' at decision block 1728), then an ordered list of selected keys 'K' is output for use in efficient segmentation at block 1732, and the process ends at 1734.

If, on the other hand, the remaining set 'R' is not empty ('no' at decision block 1728), then there can be a threshold test to see if the current segmentation should stop ('yes' at decision block 1730), or proceed with further segmentation ('no' at decision block 1730). For example, the threshold test at decision block 1730 can be related to the memory size of the largest node at the current level:

$$\text{Is largest node at level } K < \text{threshold memory size?}$$

Or, for example, the threshold test at decision block 1730 can be related to the gain in variance reduction:

$$\text{Is } g(A^*) < \text{threshold gain?}$$

There may be other threshold conditions at play. If the threshold condition is met at decision block 1730 ('yes' at decision block 1730), then there is no further segmentation necessary, and an ordered list of selected keys 'K' is output for use in efficient segmentation at block 1732, and the process ends at 1734. On the other hand, if the threshold condition is not satisfied ('no' at decision block 1730), the process reverts to block 1708, and segmentation is repeated iteratively until the process ends at 1734.

Figure 18:
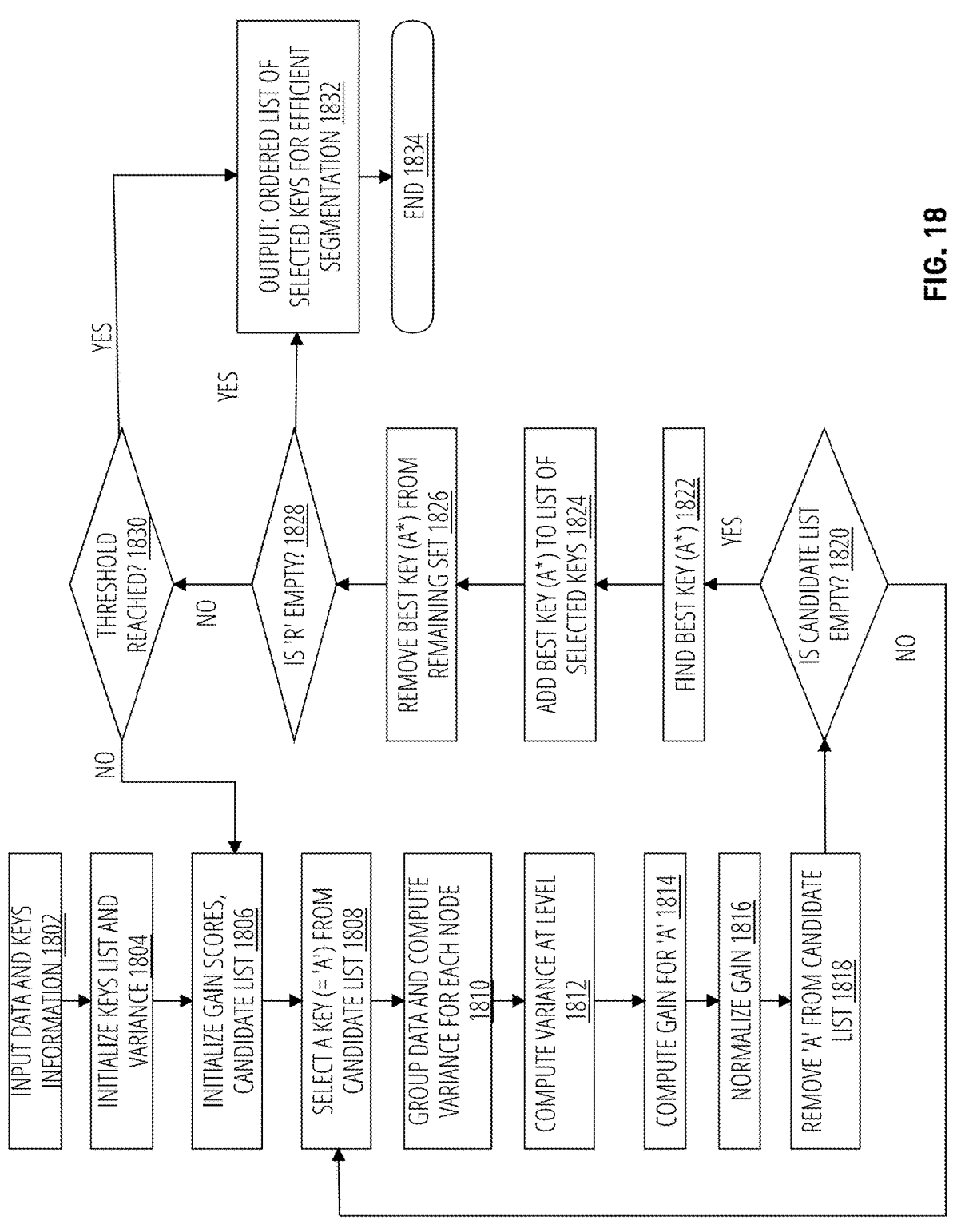
FIG. 18 illustrates a block diagram for enhanced efficient segmentation in accordance with one embodiment.

FIG. 18 illustrates a block diagram for enhanced efficient segmentation in accordance with one embodiment. FIG. 18 is similar to that of FIG. 16, except for the inclusion of block 1816, which is an embodiment of option Step 5 described above.

At block 1802, input of information takes place, including the following input: data D and a list of keys/attributes for partitioning P. D also includes a target column and one column for each key in P. Next, at block 1804, initialization takes place. This can include a list of selected keys: K=[ ], a set of remaining keys: R=P; and the variance of target column in D: V=var(target). A block 1806, an empty dictionary of gain scores 'g', is initialized, along with a candidate list C=R. At block 1808, a key (denoted by 'A') is selected from the candidate list C. Next, at block 1810, data is grouped by K∪{A} and the variance is computed for each node. At block 1812, the variance at level K∪{A} is computed as a weighted average of variances of the nodes.

The gain for 'A' is then computed at block 1814, as the amount of reduction in variance by splitting on 'A':

$$g(A) = \text{var}(K) - \text{var}(K \cup \{A\}).$$

Block 1816 refers to optional Step 5 described above, which normalizes gains for each key by its growth factor. That is, the total gain is converted into an average gain per tree branch. As an example, normalization of the gain can be based on the increase in the number of nodes:

$$g_N(A) = \frac{g(A) \times \text{nodes}(K)}{\text{nodes}(K \cup \{A\})},$$

where $g_N$ represents the normalized gain.

Next, at block 1818, 'A' is removed from the candidate list: C=C−{A}. If the candidate list C is not empty ('no' at decision block 1820), the process reverts to selecting a key at block 1808.

Once the candidate list is exhausted ('yes' at decision block 1820), the key that provides the best gain (A*) is selected at block 1822:

$$A^* = \arg \max_A g(A).$$

Once the best key, A*, is found, it is added to the list of selected keys at block 1824:

$$K = K \cup \{A^*\}.$$

Thereafter, the best key, A*, is removed from the remaining set at block 1826:

$$R = R - \{A^*\}.$$

If there are no more keys in the remaining set 'R' ('yes' at decision block 1828), then an ordered list of selected keys 'K' is output for use in efficient segmentation at block 1832, and the process ends at 1834.

If, on the other hand, the remaining set 'R' is not empty ('no' at decision block 1828), then there can be a threshold test to see if the current segmentation should stop ('yes' at decision block 1830), or proceed with further segmentation ('no' at decision block 1830). For example, the threshold test at decision block 1830 can be related to the memory size of the largest node at the current level:

$$\text{Is largest node at level } K < \text{threshold memory size?}$$

Or, for example, the threshold test at decision block 1830 can be related to the gain in variance reduction:

$$\text{Is } g(A^*) < \text{threshold gain?}$$

There may be other threshold conditions at play. If the threshold condition is met at decision block 1830 ('yes' at decision block 1830), then there is no further segmentation necessary, and an ordered list of selected keys 'K' is output for use in efficient segmentation at block 1832, and the process ends at 1834. On the other hand, if the threshold condition is not satisfied ('no' at decision block 1830), then there is further segmentation, starting at block 1806, and the process is repeated iteratively until block 1834.

Figure 19:
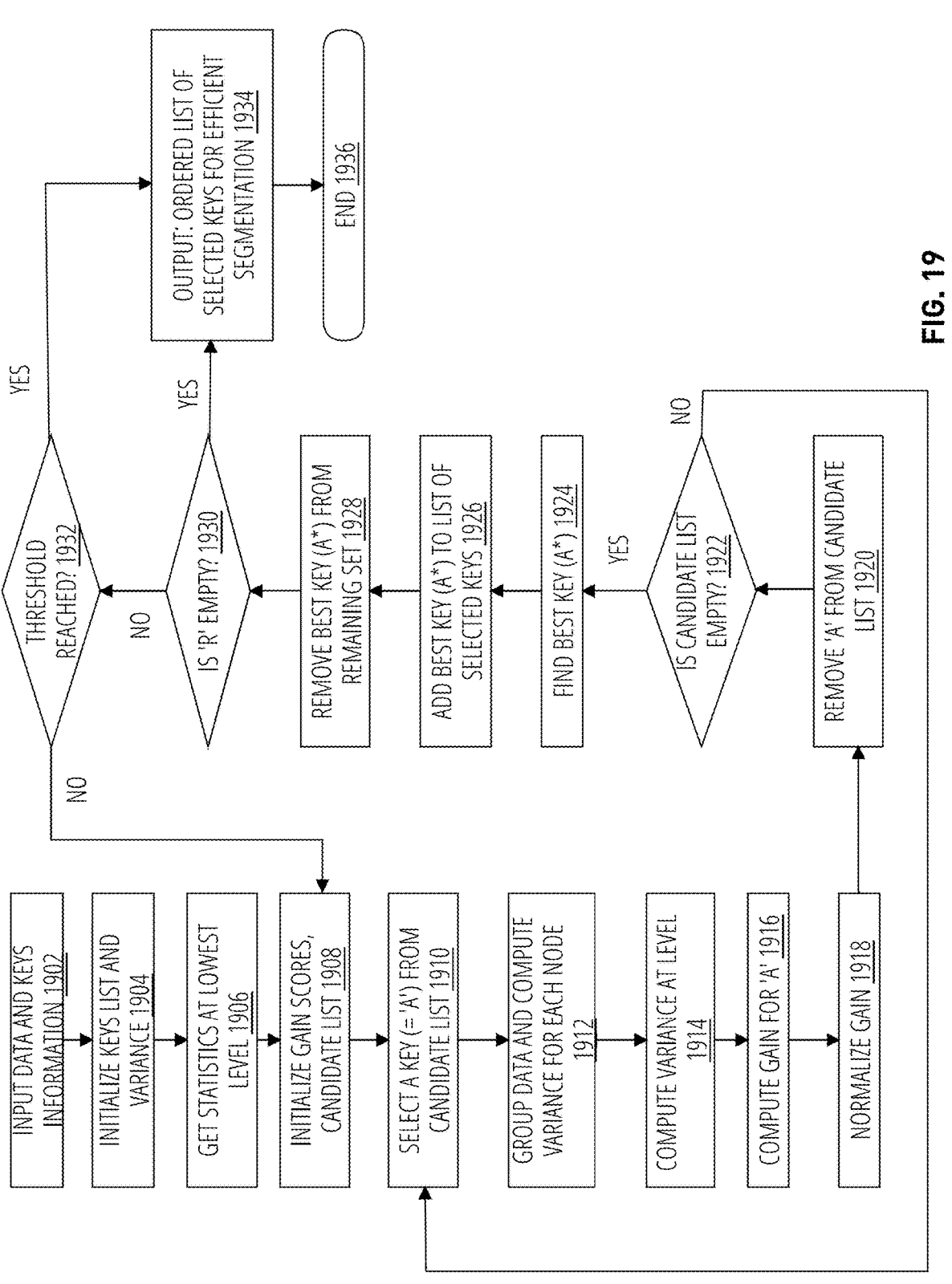
FIG. 19 illustrates a block diagram for enhanced efficient segmentation in accordance with one embodiment.

FIG. 19 illustrates a block diagram for enhanced efficient segmentation in accordance with one embodiment. FIG. 19 is similar to that of FIG. 16, except for the inclusion of block 1906 (which is an embodiment of optional Step 3 described above) and block 1918 (which is an embodiment of optional Step 5 described above).

At block 1902, input of information takes place, including the following input: data D and a list of keys/attributes for partitioning P. D also includes a target column and one column for each key in P. Next, at block 1904, initialization takes place. This can include a list of selected keys: K=[ ], a set of remaining keys: R=P; and the variance of target column in D: V=var(target).

Block 1906 refers to optional Step 3 (described above) for faster compute, in which a full partitioning by all keys is performed and three keys statistics (count, sum(target) and sum(target$^2$)) are computed at the bottom-most level of the segmentation. The data can be grouped by all keys in P, while count, sum(target), sum(target$^2$) is computed for each group.

At block 1908, an empty dictionary of gain scores 'g', is initialized, along with a candidate list C=R. At block 1910, a key (denoted by 'A') is selected from the candidate list C. Next, at block 1912, data is grouped by K∪{A} and the variance is computed for each node. Since block 1906 is now included, block 1912 can be executed very efficiently based on the statistics of the bottom-most level of the segmentation.

At block 1914, the variance at level K∪{A} is computed as a weighted average of variances of the nodes. The gain for 'A' is then computed at block 1916, as the amount of reduction in variance by splitting on 'A':

$$g(A) = \text{var}(K) - \text{var}(K \cup \{A\}).$$

Block 1918 refers to optional Step 5 described above, which normalizes gains for each key by its growth factor. As an example, normalization of the gain can be based on the increase in the number of nodes:

$$g_N(A) = \frac{g(A) \times \text{nodes}(K)}{\text{nodes}(K \cup \{A\})},$$

where $g_N$ represents the normalized gain.

Next, at block 1920, 'A' is removed from the candidate list: C=C−{A}. If the candidate list C is not empty ('no' at decision block 1922), the process reverts to selecting a key at block 1910.

Once the candidate list is exhausted ('yes' at decision block 1922), the key that provides the best gain (A*) is selected at block 1924:

$$A^* = \arg\max_A g(A).$$

Once the best key, A*, is found, it is added to the list of selected keys at block 1926:

$$K = K \cup \{A^*\}.$$

Thereafter, the best key, A*, is removed from the remaining set at block 1928:

$$R = R - \{A^*\}.$$

If there are no more keys in the remaining set 'R' ('yes' at decision block 1930), then an ordered list of selected keys 'K' is output for use in efficient segmentation at block 1934, and the process ends at 1936.

If, on the other hand, the remaining set 'R' is not empty ('no' at decision block 1930), then there can be a threshold test to see if the current segmentation should stop ('yes' at decision block 1932), or proceed with further segmentation ('no' at decision block 1932). For example, the threshold test at decision block 1932 can be related to the memory size of the largest node at the current level:

$$\text{Is largest node at level } K < \text{threshold memory size?}$$

Or, for example, the threshold test at decision block 1932 can be related to the gain in variance reduction:

$$\text{Is } g(A^*) < \text{threshold gain?}$$

There may be other threshold conditions at play. If the threshold condition is met at decision block 1932 ('yes' at decision block 1932), then there is no further segmentation necessary, and an ordered list of selected keys 'K' is output for use in efficient segmentation at block 1934, and the process ends at 1936. On the other hand, if the threshold condition is not satisfied ('no' at decision block 1932), the process reverts to block 1908, and segmentation is repeated iteratively until the process ends at 1936.

Figure 20:
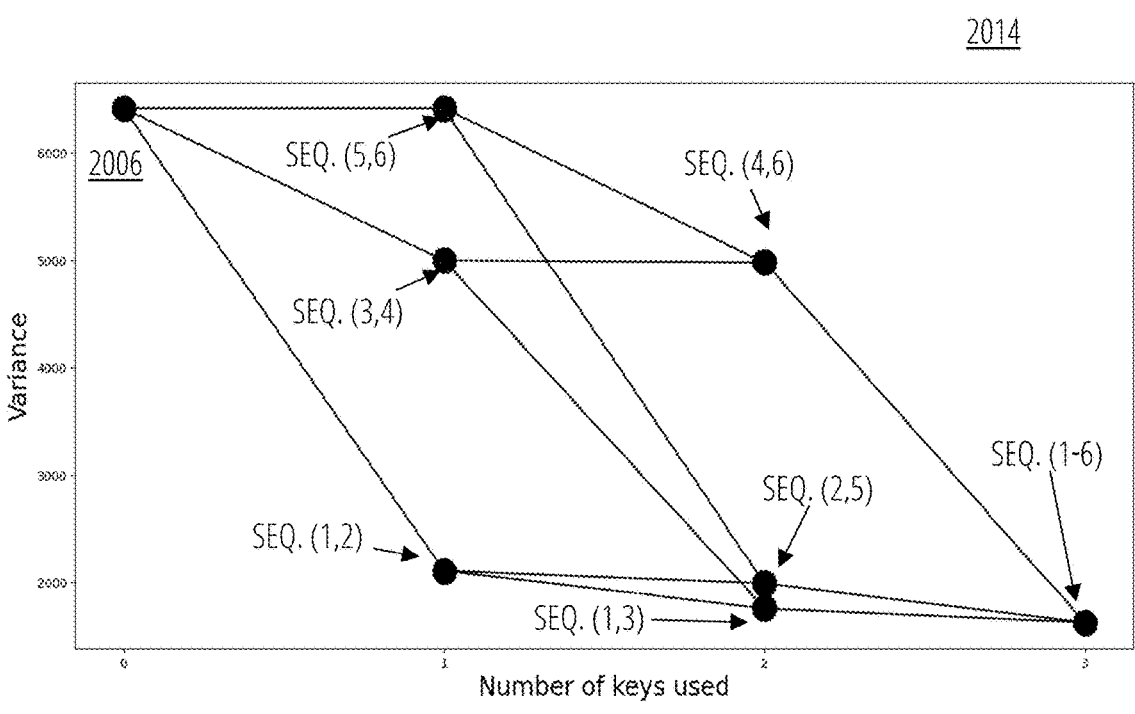
FIG. 20 illustrates an example of efficient segmentation with three keys, in accordance with one embodiment.

FIG. 20 illustrates an example of efficient segmentation with three keys, in accordance with one embodiment. Here, the root node, 2006, contains all of the data which has an initial variance of roughly 6,500. The initial segmentation can take place by either attribute #1, attribute #2, or attribute #3, and subsequent attributes, for a total of six sequences of attributes for each segmentation step:

| Seq | Segmentation 1 | Segmentation 2 | Segmentation 3 |
|---|---|---|---|
| 1 | Attribute #1 | Attribute #2 | Attribute #3 |
| 2 | Attribute #1 | Attribute #3 | Attribute #2 |
| 3 | Attribute #2 | Attribute #1 | Attribute #3 |
| 4 | Attribute #2 | Attribute #3 | Attribute #1 |
| 5 | Attribute #3 | Attribute #1 | Attribute #2 |
| 6 | Attribute #3 | Attribute #2 | Attribute #1 |

FIG. 20 illustrates the reduction in variance for each of the sequences, at the various levels of segmentation. For example, at the first level of segmentation (number of keys used=1), the data can be partitioned first by either Attribute

1, Attribute #2 or Attribute #3. Where Attribute #1 is used first (that is, either Seq. 1 or 2), the variance is reduced to roughly 2,000. On the other hand, where Attribute #2 is used first (that is, either Seq. 3 or 4), the variance is reduced to roughly 5,000. Finally, if Attribute #3 is used first (that is, either Seq. 5 or 6), the variance roughly remains unchanged at 6,500.

For a sequence that first began with Attribute #1, the second level of segmentation can occur either with Attribute #2 (Seq. 1), or Attribute #3 (Seq. 2)—depending on the configuration selected at the outset of the segmentation. Where Seq. 1 is chosen, at the second level, the variance is further reduced to roughly 1,800, from a first level of roughly 2,000. On the other hand, where Seq. 2 is chosen, at the second level, the variance remains unchanged from a first level of roughly 2,000.

For a sequence that first began with Attribute #2, the second level of segmentation can occur either with Attribute #1 (Seq. 3), or Attribute #3 (Seq. 4)—depending on the configuration selected at the outset of the segmentation. Where Seq. 3 is chosen, at the second level, the variance is further reduced to roughly 1,800, from a first level of roughly 5,000. Note that this is the same result as Seq. 1. On the other hand, where Seq. 4 is chosen, at the second level, the variance remains unchanged from a first level of roughly 5,000.

For a sequence that first began with Attribute #3, the second level of segmentation can occur either with Attribute #1 (Seq. 5), or Attribute #2 (Seq. 6)—depending on the configuration selected at the outset of the segmentation. Where Seq. 5 is chosen, at the second level, the variance is further reduced to roughly 2,000, from a first level of roughly 6,500. Note that this is the same result as Seq. 2. On the other hand, where Seq. 6 is chosen, at the second level, the variance remains is reduced to roughly 5,000 from a first level of roughly 6,500. Note that this is the same result as Seq. 4.

Finally, at the third level of segmentation, all three attributes are used, resulting in a final variance of roughly 1,300. This corresponds to all six sequences 1-6. In efficient segmentation, however, segmentation according to all keys is not performed, but instead, will stop when the remaining nodes first reach a memory threshold where the memory size of each node is less than a pre-defined threshold. As such, segmentation may stop at the first or second level. Note, that in efficient segmentation, there is no consideration given to variance reduction through the segmentation process.

Figure 21:
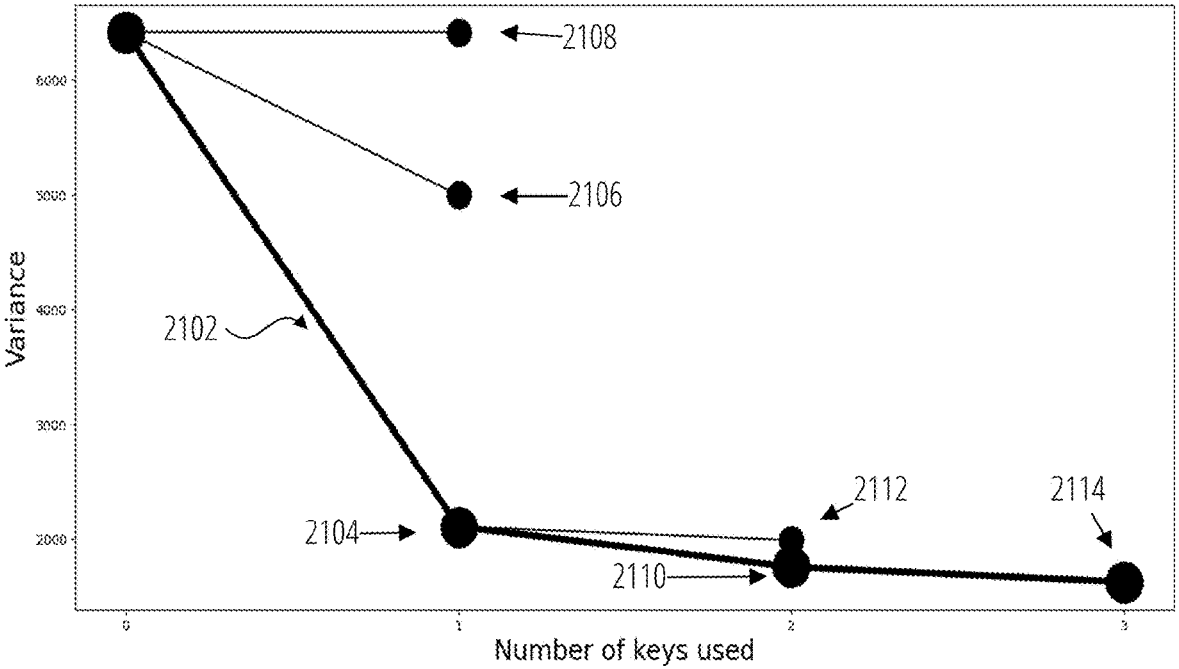
FIG. 21 illustrates and example of enhanced efficient segmentation with three keys in accordance with one embodiment.

FIG. 21 illustrates and example of enhanced efficient segmentation with three keys in accordance with one embodiment. As opposed to the example shown in FIG. 17, the reduction of variance is used to determine which attributes, and the sequence of attributes to use for efficient segmentation. The table of sequences defined above (that is, with respect to FIG. 20), is also used with reference to FIG. 21.

At the first level of segmentation (number of keys used=1), there are three possible types of segmentation: according to Attribute #1 (2104), Attribute #2 (2106), or Attribute #3 (2108). The greatest reduction in variance at level 1 is for Attribute #1 (2104). Thus Attribute #1 is then selected at the first level of segmentation. At this point, segmentation can stop if the memory size of the resulting nodes is below a threshold.

If a second segmentation is required, it occurs using either Attribute #2 (2110) or Attribute #3 (2112). The greatest reduction in variance at this level is for Attribute #2 (2110). Thus Attribute #2 is then selected at the second level of segmentation. At this point, segmentation can stop if the memory size of the resulting nodes is below a threshold.

Note that in the enhancement, the order of attributes is selected according to variance reduction—which leads to more accurate machine learning forecasting. Without the use of variance reduction—that is, simple efficient segmentation, it is left to the discretion of a user as to which attributes and their respective order, to select for the segmentation process. For example, with reference to FIG. 20, a user may preconfigure the efficient segmentation process with Attribute #3 as the first key, followed by Attribute #2 as the second key—resulting in a relatively low reduction in variance—which affects the accuracy of the trained machine learning models. With the enhancement shown in FIG. 21, the selection and order of attributes is automatically performed, leading to the most accurate forecasting of the trained machine learning models.

Further Details of Optional Step 3

Step 3 improves the efficiency of the process.

A full partitioning by all of the keys is performed. Three statistics, including count, sum of the target column, and sum of target square, at the bottom most level are calculated. This enables the computation of the variances at any higher level based on those statistics at the bottom-most level.

$$\text{Var} = E[X^2] - \{E[X]\}^2$$

$$\text{Var} = \frac{1}{n}\sum_{i=1}^{n} x^2 - \left(\frac{1}{n}\sum_{i=1}^{n} x\right)^2$$

If x represents the quantities, then the count, sum(x) and sum($x^2$) can be computed and maintained in the lowest level. Since each node at a higher level is an aggregation of multiple nodes at the lowest level, then the same statistics can be computed at the higher level by simply adding the statistics of the lower level. Therefore, in order to compute the variance at any higher level, it is sufficient to have the statistics on the lowest level; the latter can be used to incrementally compute the variance.

An advantage of this step is demonstrated as follows. At the topmost level (root node), in one example, 10 billion rows in the data. Every time there is a segmentation from the top, variances have to be computed across each group in the segment. At the root node, which means going through 10 billion rows of data. After the first segmentation, each group may have, say 3 billion rows of data, which must be processed to obtain the variance across the given group. Further segmentation, requires further calculation of variances across hundreds of millions and tens of millions of rows.

However, at the bottom-most level of the segmentation, there can be roughly one million rows of data. The three statistics calculated at the bottom-most level, can then be used to construct the variance at the upper levels based on aggregation—rather than processing the individual rows—thus saving much computation time and processing resources.

As an example, if there are 10 billion rows at the top-most level, and these are grouped by three attributes, the result will be a bottom-most level with roughly 1,000,000 rows. The variance at the nodes in between the top-most level (10 billion rows) and the bottom-most level (10 million rows) can be obtained from the bottom-most level results. Therefore, computation of the variance of these "intermediatelevel" nodes can be based on a 1,000,000 row data frame instead executing on a 10 billion row data frame.

In one example, there are two attributes (item category and distribution centre). There are 3 item categories and 5 distribution centres, leading to a total of 15 combinations of item categories and distribution centres. The initial data frame is 10 billion rows which end up in 15 groups at the bottom-most level. The three statistics are computed for each of the 15 groups; namely, the count, the sum of quantities and the sum of quantities squared with respect to the number of rows within each of those groups. As an example of the count, this refers to the number of rows of in a given grouping of (item category, distribution centre). For example, there are 100 million rows for sandwiches at DC-1; 200 million rows for beverages at DC-2, and so on.

Every node at one level higher than the bottom-most level, has a variance that is an aggregation of a subset of the three statistics for each of the 15 groups. Therefore it is basically a reduction from 15 to 3 or 15 to 5 to get to the next upper level, instead of processing the variation on 10 billion rows. This reduces the computation time by a factor of roughly 1000.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computing apparatus comprising:
a processor; and
a memory storing instructions that, when executed by the processor, configure the apparatus to:

segment a root node that includes a dataset, into a plurality of segments according to a first attribute, the root node exceeding a memory threshold;
aggregate two or more of the segments into one or more aggregated segments, the one or more aggregated segments each having a memory size equal to or below the memory threshold; and
recursively:
segment, according to successive attributes, any segment that exceeds the memory threshold; and
aggregate two or more segments into aggregated segments that are less than or equal to the memory threshold;
until no further segmentation or aggregation can be performed.

2. The computing apparatus of claim 1, wherein aggregating is based on memory usage and resource utilization.

3. The computing apparatus of claim 2, wherein aggregating is based on a best-fit algorithm.

4. The computing apparatus of claim 2, wherein aggregating is based on an entropy-based algorithm.

5. The computing apparatus of claim 1, wherein aggregating is based on grouping segments with similar features.

6. A non-transitory computer-readable storage medium, the computer-readable storage medium including instructions that when executed by a computer, cause the computer to:

segment a root node that includes a dataset, into a plurality of segments according to a first attribute, the root node exceeding a memory threshold;
aggregate two or more of the segments into one or more aggregated segments, the one or more aggregated segments each having a memory size equal to or below the memory threshold; and
recursively:
segment, according to successive attributes, any segment that exceed the memory threshold; and
aggregate two or more segments into aggregated segments that are less than or equal to the memory threshold,
until no further segmentation or aggregation can be performed.

7. The computer-readable storage medium of claim 6, wherein aggregating is based on memory usage and resource utilization.

8. The computer-readable storage medium of claim 7, wherein aggregating is based on a best-fit algorithm.

9. The computer-readable storage medium of claim 7, wherein aggregating is based on an entropy-based algorithm.

10. The computer-readable storage medium of claim 6, wherein aggregating is based on grouping segments with similar features.

11. A computer-implemented method for segmenting a dataset into a plurality of segments, the dataset grouped according to a plurality of attributes, the method comprising:

segmenting a root node that includes the dataset, into a plurality of segments according to a first attribute, the root node exceeding a memory threshold;
aggregating two or more segments into one or more aggregated segments, the one or more aggregated segments each having a memory size equal to or below the memory threshold; and
recursively:
segmenting, according to successive attributes, any segment that exceed the memory threshold; and aggregating two or more segments into aggregated segments that are less than or equal to the memory threshold;

until no further segmentation or aggregation can be performed.

12. The computer-implemented method of claim 11, wherein aggregating is based on memory usage and resource utilization.

13. The computer-implemented method of claim 12, wherein aggregating is based on a best-fit algorithm.

14. The computer-implemented method of claim 12, wherein aggregating is based on an entropy-based algorithm.

15. The computer-implemented method of claim 11, wherein aggregating is based on grouping segments with similar features.

\* \* \* \* \*